US011176602B2

(12) United States Patent
Sorensen

(10) Patent No.: US 11,176,602 B2
(45) Date of Patent: Nov. 16, 2021

(54) INTERACTIVE TRANSACTION SYSTEM, METHOD, AND DEVICE FOR PHYSICAL MERCHANT STORES

(71) Applicant: Shopper Scientist LLC, Corbett, OR (US)

(72) Inventor: Herb Sorensen, Corbett, OR (US)

(73) Assignee: SHOPPER SCIENTIST LLC, Corbett, OR (US)

( * ) Notice: Subject to any disclaimer, the term of this patent is extended or adjusted under 35 U.S.C. 154(b) by 60 days.

(21) Appl. No.: 16/653,756

(22) Filed: Oct. 15, 2019

(65) Prior Publication Data

US 2020/0043086 A1 Feb. 6, 2020

Related U.S. Application Data

(63) Continuation-in-part of application No. 14/627,981, filed on Feb. 20, 2015, now abandoned.

(51) Int. Cl.
*G06Q 30/00* (2012.01)
*G06Q 30/06* (2012.01)
*G06N 3/08* (2006.01)
*G06F 3/0482* (2013.01)
*G06F 3/0488* (2013.01)

(52) U.S. Cl.
CPC .......... *G06Q 30/0643* (2013.01); *G06N 3/08* (2013.01); *G06Q 30/0625* (2013.01); *G06Q 30/0631* (2013.01); *G06Q 30/0633* (2013.01); *G06Q 30/0639* (2013.01); *G06F 3/0482* (2013.01); *G06F 3/04886* (2013.01)

(58) Field of Classification Search
CPC ................. G06Q 30/0601–0645; G06Q 30/08
USPC ............................................... 705/26.1–27.2
See application file for complete search history.

(56) References Cited

U.S. PATENT DOCUMENTS

| 2004/0167788 A1* | 8/2004 | Birimisa | G06Q 10/06375 705/7.37 |
| 2010/0169336 A1* | 7/2010 | Eckhoff-Hornback | G06Q 20/203 707/758 |
| 2015/0112826 A1* | 4/2015 | Crutchfield, Jr. | G06Q 30/0643 705/26.1 |

(Continued)

OTHER PUBLICATIONS

Faris, Personalized Advertising is an Oxymoron, Oct. 10, 2016, Medium.com, accessed at [https://medium.com/context/personalized-advertising-is-an-oxymoron-77c95f608fb5] (Year: 2016).*

*Primary Examiner* — Jeffrey A. Smith
*Assistant Examiner* — Lindsey B Smith
(74) *Attorney, Agent, or Firm* — Alleman Hall Creasman & Tuttle LLP

(57) ABSTRACT

An interactive transaction system is provided. A terminal, located adjacent or in proximity to a merchandise display, comprises a touch screen device, associated with the product category, configured to present a subset of products within the product category, determining the subset of products within the product category according to an algorithm that may take into account a profile of a shopper interacting with the terminal, a location of the terminal inside the physical merchant store, and products that are located in proximity to the terminal. The terminal is further configured to receive a shopper selection associated with at least one of the products in the subset of products within the product category for fulfillment.

20 Claims, 20 Drawing Sheets

(56) References Cited

U.S. PATENT DOCUMENTS

2015/0332087 A1* 11/2015 Joshi .................. G06K 9/00
                                                              382/203
2020/0341781 A1* 10/2020 Schoppe ............ G06Q 30/0271

* cited by examiner

INTERACTIVE TRANSACTION SYSTEM, METHOD, AND DEVICE FOR PHYSICAL MERCHANT STORES

CROSS REFERENCE TO RELATED APPLICATIONS

The present application is a continuation-in-part of U.S. patent application Ser. No. 14/627,981, entitled INTERACTIVE TRANSACTION SYSTEM FOR PHYSICAL MERCHANT STORES, filed Feb. 20, 2015, the entirety of which is hereby incorporated herein by reference for all purposes.

BACKGROUND

The term long tail has gained popularity in the retailing world to describe the strategy of selling a large number of unique items with relatively small quantities sold of each. The related term big head is used to describe the strategy of selling a small number of unique items with relatively large quantities sold of each. Many stores in the world apply both strategies to attract shoppers and achieve sales. However, conventional stores that apply the long tail strategy often waste capital deploying floor space for inventory that accounts for only a small proportion of overall sales. In some extreme cases, 50% of unique items in a store may contribute only 5% of total store sales. On the other hand, conventional stores that apply the big head strategy, offering only a handful of selections in each product category, often lose customers who prefer to purchase products in the long tail, reducing potential sales.

In contrast, online stores, which do not need to deploy any retail floor space, have an advantage over conventional stores in applying the long tail strategy while saving capital. For example, a large proportion of the book sales of many online booksellers come from obscure books that are not available in conventional, brick-and-mortar stores. Recognizing these advantages that online retailers enjoy, many conventional retail stores have recently begun to apply some aspects of the online experience to the shopper's experience in brick-and-mortar stores. For instance, retailers from clothing boutiques to grocers have deployed touch screen devices in kiosks that shoppers can use to look up inventory and complete sales.

However, these technologies have yet to address the problem of capital that is wasted in deploying floor space for vast quantities of inventory that only contribute a small proportion of overall sales. Conventional retailers are reluctant to completely abandon retail floor space, since strategically designed floor spaces can help attract shoppers and generate foot traffic into the stores. However, existing technologies adopted by conventional retailers in brick-and-mortar stores have yet to achieve similar advantages that online retailers have in applying the long tail strategy to achieve a large proportion of overall sales selling a large number of unique items with relatively small quantities sold of each.

SUMMARY

To address the above discussed issues, and provide physical merchant stores with similar advantages that online retailers enjoy in applying the long tail strategy, an interactive transaction system is provided. A terminal, located inside the physical merchant store adjacent or in proximity to a merchandise display, comprises a touch screen device, associated with the product category, configured to present a subset of products within the product category, the subset of products within the product category being determined according to an algorithm that may take into account a profile of a shopper interacting with the terminal, a location of the terminal inside the physical merchant store, and products that are located in proximity to the terminal.

The terminal is further configured to receive a shopper selection associated with at least one of the products in the subset of products within the product category for fulfillment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1:
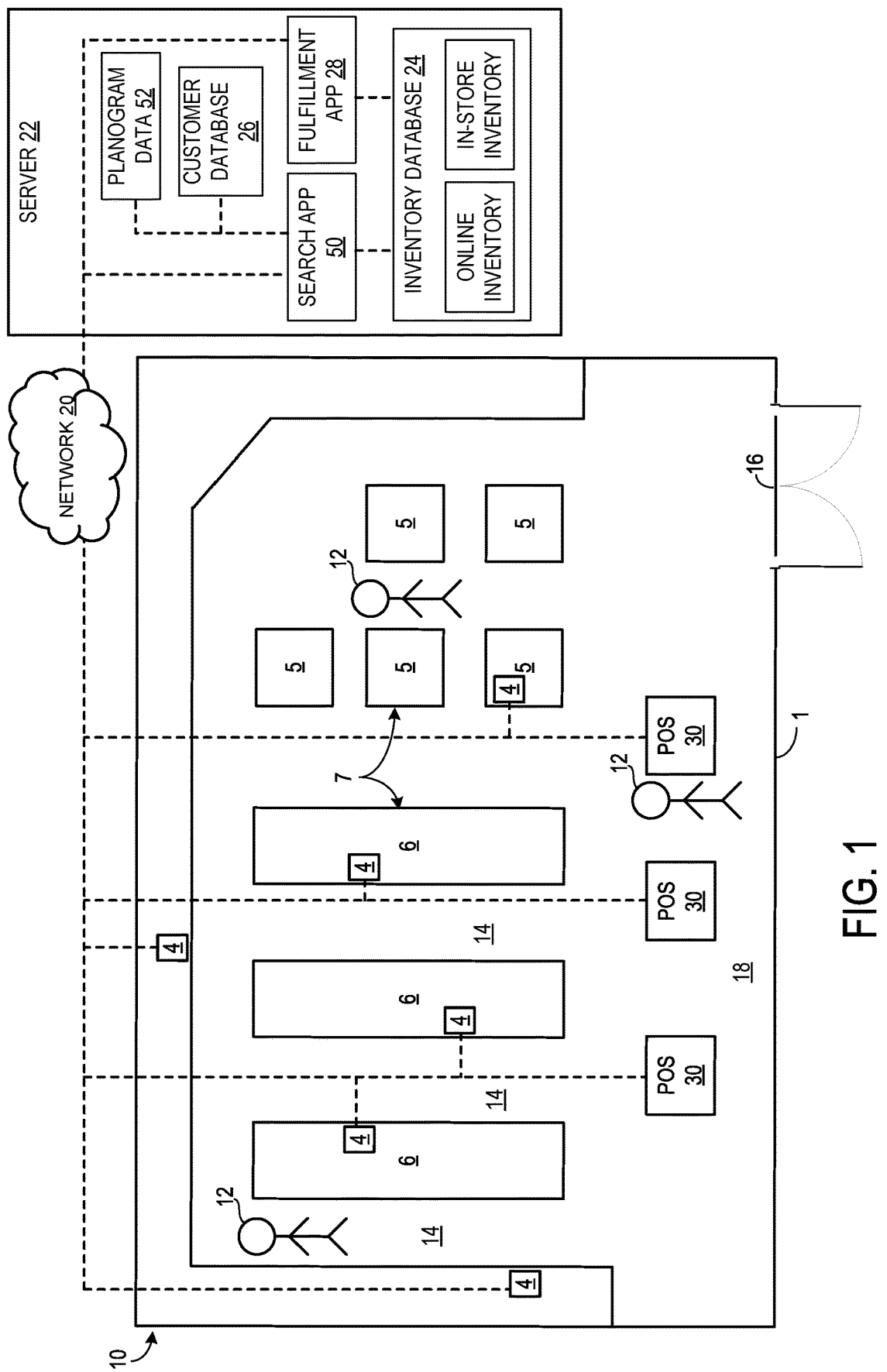
FIG. 1 shows a schematic depiction of an example interactive transaction system.

Accordingly, systems for applying the long tail strategy in a shopping environment in a physical merchant store are disclosed herein. FIG. 1 shows a schematic depiction of an example shopping environment 1 inside a physical merchant store, in which one or more shoppers 12 are shopping. It will be appreciated that the physical merchant store may be, for example, a physical building serving as a retail location in which various products are offered for sale. Example physical merchant stores include supermarkets, clothing retailers, department stores, hardware stores, restaurants, bazaars, malls, etc.

An interactive transaction system 10 for applying the long tail strategy in a shopping environment 1 is provided. The shopping environment 1 comprises a plurality of products arranged on shelves 6 and display counters 5, including a store shopping floor 18, a store entrance/exit 16, and shopping aisles 14 which are defined by the walls of the physical merchant store, aisle displays 5, and/or the shelves 6. Stores displays 5 and shelves 6 are not particularly limited, and may encompass windows, racks, revolving racks, tables, hangers, cases, freezers, cases, boxes, mannequins, and combinations thereof. In certain embodiments, the shopping environment may also include outdoor shopping space that surrounds the physical merchant store, or indoor mall shopping space that is adjacent to the physical merchant store. The system 10 comprises merchandise displays 7 that are located inside a shopping environment 1 in the physical merchant store, with terminals 4 that are located in the physical merchant store adjacent to or in proximity to each merchandise display 7. The merchandise displays 7 may be arranged in varied locations throughout the store 1. The merchandise displays 7 may include shelves 6 and bazaar displays 5, for example, or endcap displays, point of purchase displays, refrigerated shelving, service counters, etc. For example, the terminals 4 may be especially deployed in areas of the store that experience the most foot traffic by shoppers 12. The locations of the terminals 4 may also be determined by other factors, including the product category of the surrounding shelves 6, the placement of related products throughout the store, and analyses of the decision-making process employed by shoppers 12. For example, pasta sauce products may be placed in a merchandise display consisting of shelving within the pasta products aisle, or placed in proximity to shelving on which condiments are displayed if shopper tracking data indicates that shoppers generally prefer to pick up pasta sauces while picking up condiments, as one specific example.

Terminals 4 inside the shopping environment 1 are connected within a computer network 20 that connects terminals 4 with one another and that links each terminal 4 to point of sale device 30, where shoppers 12 may check out items that were picked up in a shelf 6, display 5, or a merchandise display 7, or receive items that were ordered on a terminal 4. However, in other embodiments, the terminal 4 itself may also function as the point of sale device, so that the shopper may not be required to walk to a point of sale 30 to carry out a purchase. In the preferred embodiment, the computer network 20 is a secure wireless network including wireless access points to which terminals 4 connect within the physical merchant store, but the network may also be a wired network. The computer network 20 is connected to a server 22 that provides an inventory database 24 comprising an in-store inventory and online inventory, customer database 26, planogram data 52, a search application 50, and a fulfillment application 28. The computer network 20 may comprise a wired and/or wireless communication network. Additional technical details of the hardware architecture of the interactive transaction system 10 are discussed below in relation to FIG. 4.

Figure 2A:
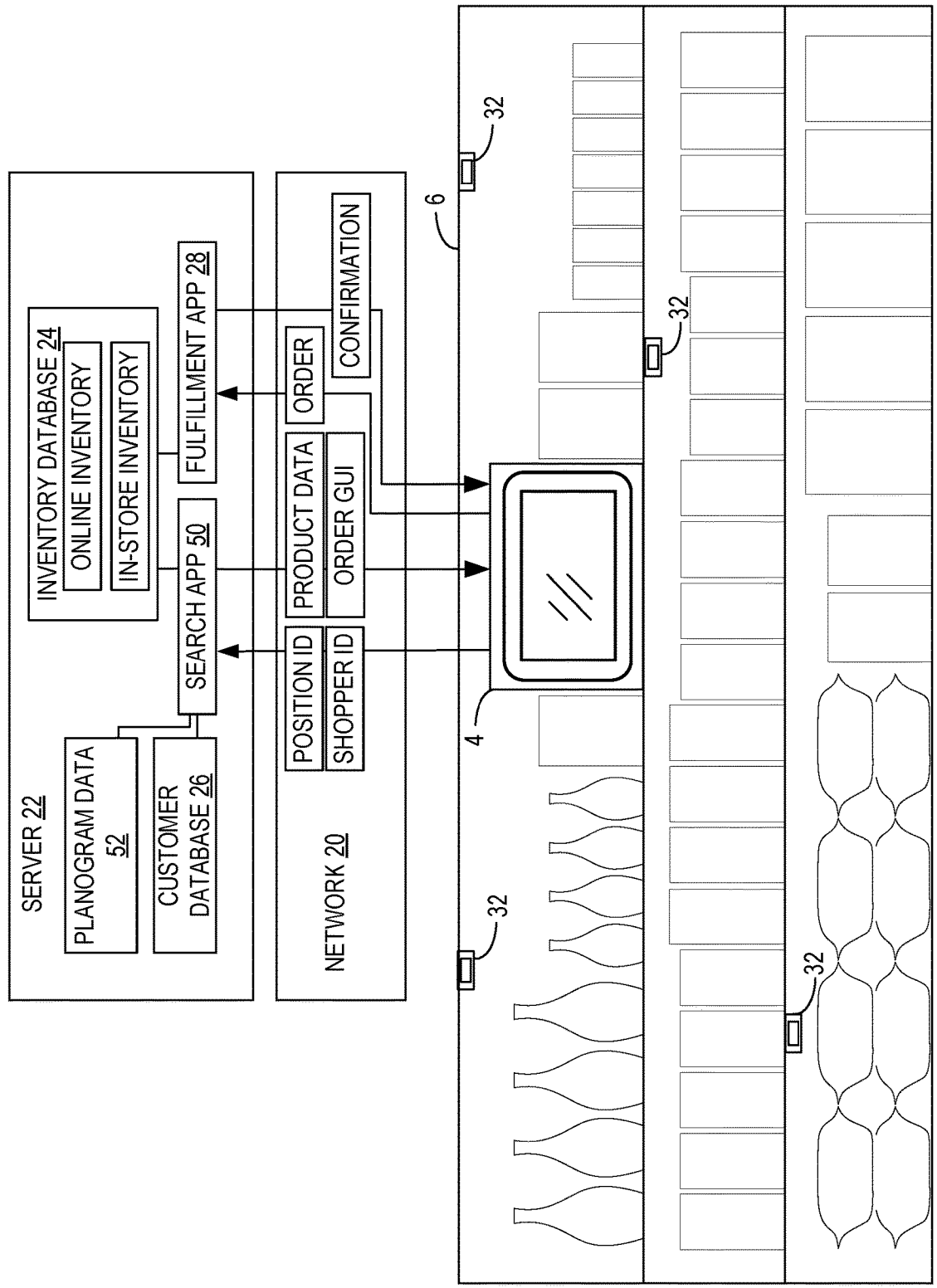
FIG. 2A shows a schematic depiction of an example merchandise display and terminal of the transaction system of FIG. 1, the terminal being situated adjacent to and within a store shelf, and communicating with the server of the transaction system of FIG. 1.
Figure 2B:
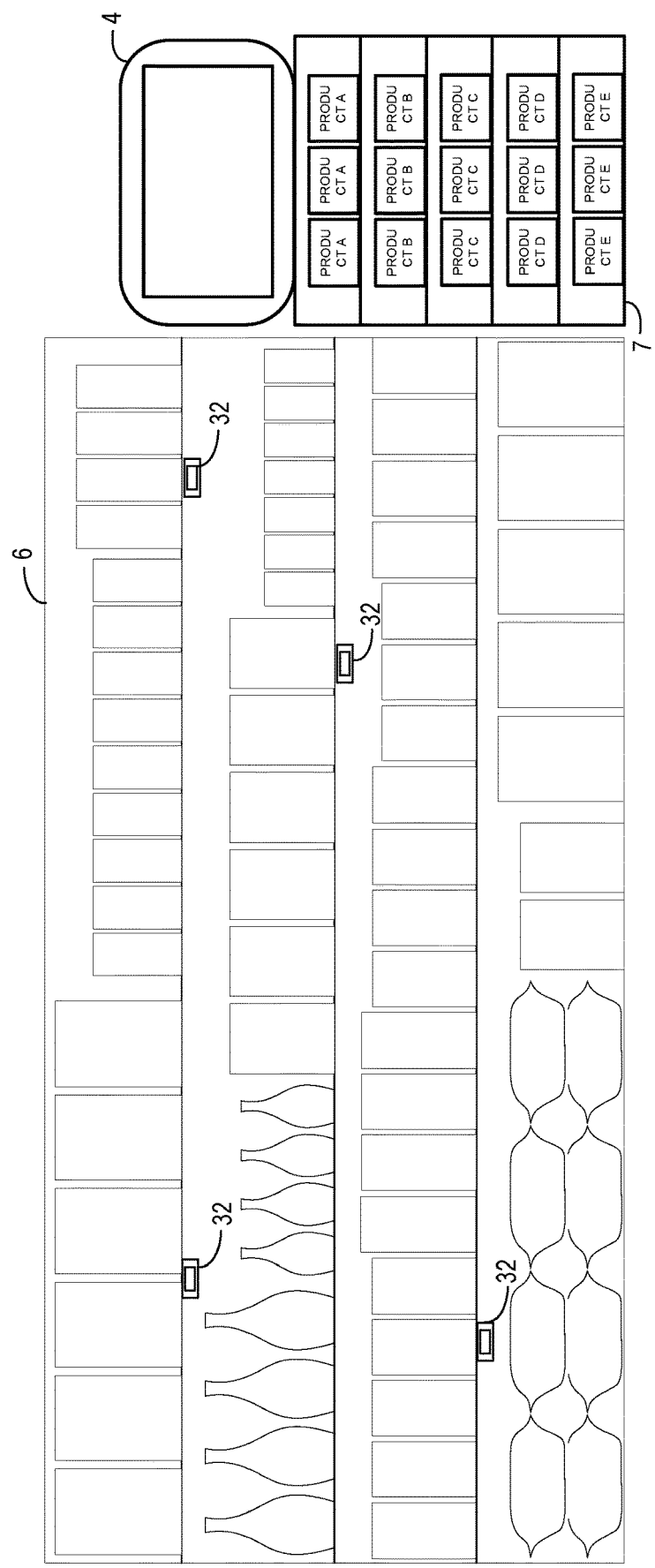
FIG. 2B shows a schematic depiction of another example merchandise display and terminal of the transaction system of FIG. 1, the terminal being situated adjacent to and laterally next to a store shelf, and positioned within an endcap display kiosk.

In each of the embodiments illustrated in FIGS. 2A and 2B, a terminal 4 is located adjacent to or in proximity to a merchandise display 7. Each merchandise display 7 contains a subset of products within a product category. Typically, surrounding shelf space is occupied by better selling products within a product category, i.e., so-called big head inventory, enabling a shopper 12 to casually grab such a top selling product and go. On the other hand, the terminal 4 facilitates purchases in the long tail inventory, i.e., the inventory within the product category which is not within a top selling selection of products that are displayed in the merchandise display 7, so that the store owner may devote less shelf space to those long tail items, more of which may be stored in a stock portion of the physical merchant store or a warehouse. The terminal may also provide a wireless transmitter to indicate the location or position of shoppers at terminals inside the store. The terminal 4 may generate a position identifier by self-sensing its location within the shopping environment by referring to planogram data that is stored on a server 22, or by receiving input from an administrator who inputs its location manually, for example. When the planogram data also indicates the location of each product within the physical merchant store, the terminal 4 may generate a position identifier that identifies a location within the planogram, and thus indicates a position of the terminal relative to each product in the planogram. Terminals may be connected to a source of AC or DC power inside the store. Alternatively, the terminals may include an internal power source such as a battery.

FIG. 2A illustrates an embodiment in which the terminal 4 is mounted on a shelf 6, oriented toward the shopper. FIG. 2B illustrates an embodiment in which the terminal 4 and merchandise display 7 may be integrated into a kiosk, which includes shelves and products placed on the shelves in the merchandise display 7, and an integrated housing for terminal 4 in one assembly.

Typically, the terminal 4 sends a position identifier and a shopper identifier to a search application 50 on the server device 22. The shopper identifier may be inputted by the shopper by touch input, via a card reader, scanning a QR code by a camera on the terminal 4, via wireless detection of an RFID card of the shopper containing the code, via Bluetooth or other wireless communication with a smartphone or other device storing the shopper identifier, etc. The position identifier may be generated by terminal 4 by self-sensing its location within the shopping environment, or by an administrator inputting its location manually. The position identifier may be a location within a planogram of the store, for example. The search application 50 identifies the location within planogram data 52 for the physical merchant store, stored at the server device 22, and identifies a shopper profile associated with the received shopper identifier within a customer database 26. The search application 50 may identify various shopper profile characteristics, and may identify a product category from the planogram data 52 for products that are adjacent to the position of the terminal 4, and may send a search query to the inventory database 24 to find matching online and/or in-store inventory that match the shopper profile characteristics and the product categories of the adjacent products, as determined from the planogram data 52. Such product data is typically ranked according to various ranking criteria, as discussed in detail below, and sent to the terminal 4 along with data for displaying an order GUI on the terminal 4. The terminal 4 may, in turn, receive an order from a user of the terminal 4 for a product depicted on the terminal 4, which order may be sent to a fulfillment application 28 that is associated with a payment regimen, such as Apple Pay, PayPal, or other payment services. Once the order is verified at the fulfillment application 28, a confirmation of order receipt may be displayed on the terminal 4. The ordering process is also described in detail below.

In certain embodiments, shopping aids 32, or audio aids and/or visual aids in the shopping environment, may guide shoppers to products, especially those in the big head inventory and those in a limited selection of the long tail inventory that is provided throughout the shopping environment. For example, in certain embodiments, a shopper may browse for a product in a terminal 4, select it, and a shopping aid 32 may direct the shopper to the selected product that is located in relatively close proximity to the terminal 4 by activating the audio and/or visual aids. In other embodiments, the kiosks may be easily moveable by store personnel on the shopping floor 18, having wheels and the like, that allow store personnel to adjust the placement of each kiosk in the shopping environment 1 to adapt to changes in shopping behavior. For example, before Christmas, a merchandise display with fruitcakes may be strategically moved to a store aisle featuring Christmas ornaments, or conversely, a merchandise display with Christmas ornaments may be strategically moved to a store aisle featuring fruitcakes.

Figure 3A:
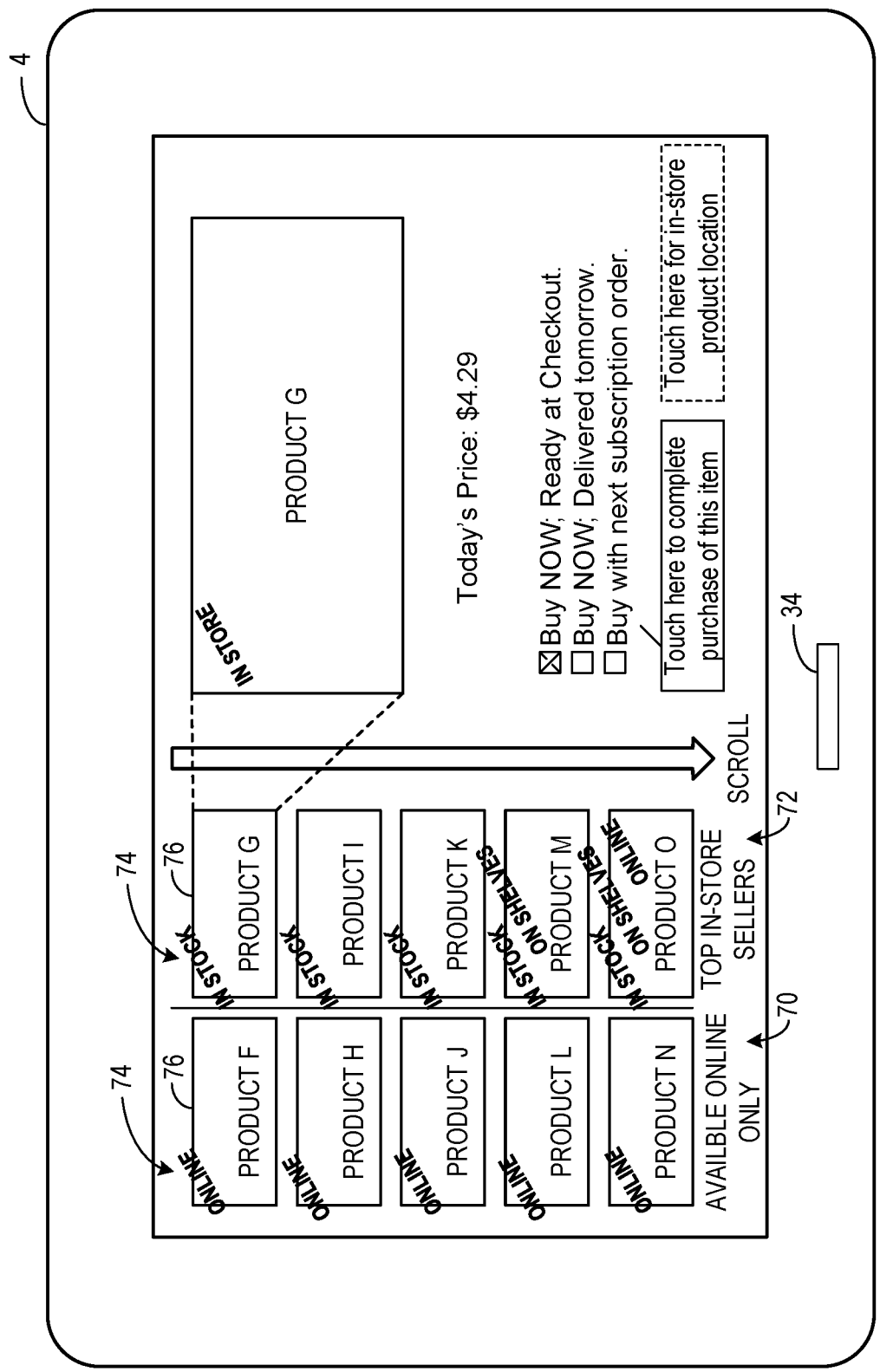
FIGS. 3A-C show schematic depictions of example terminals of FIGS. 2A-B, with differing displays of products.
Figure 3B:
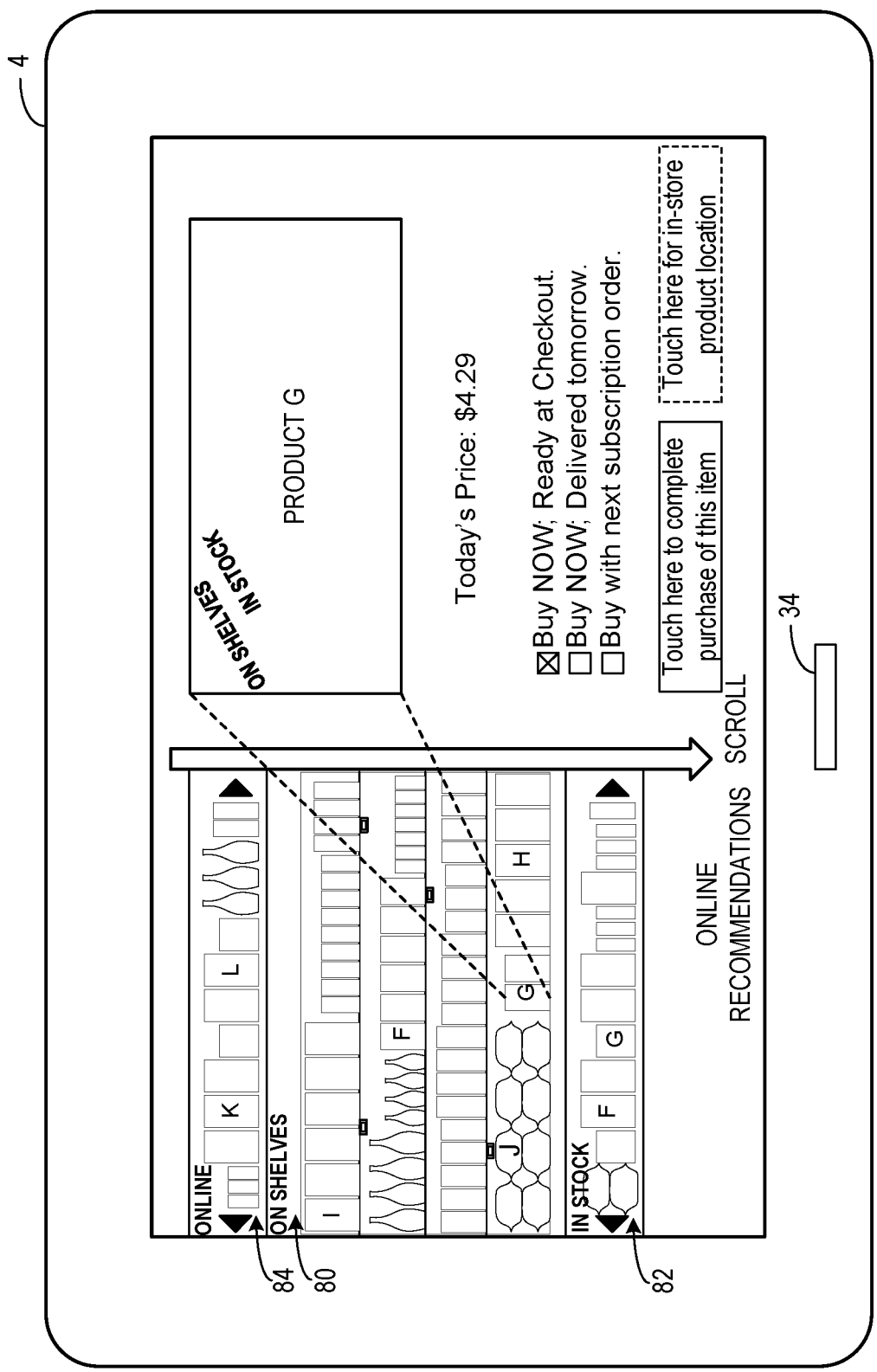
Figure 3C:
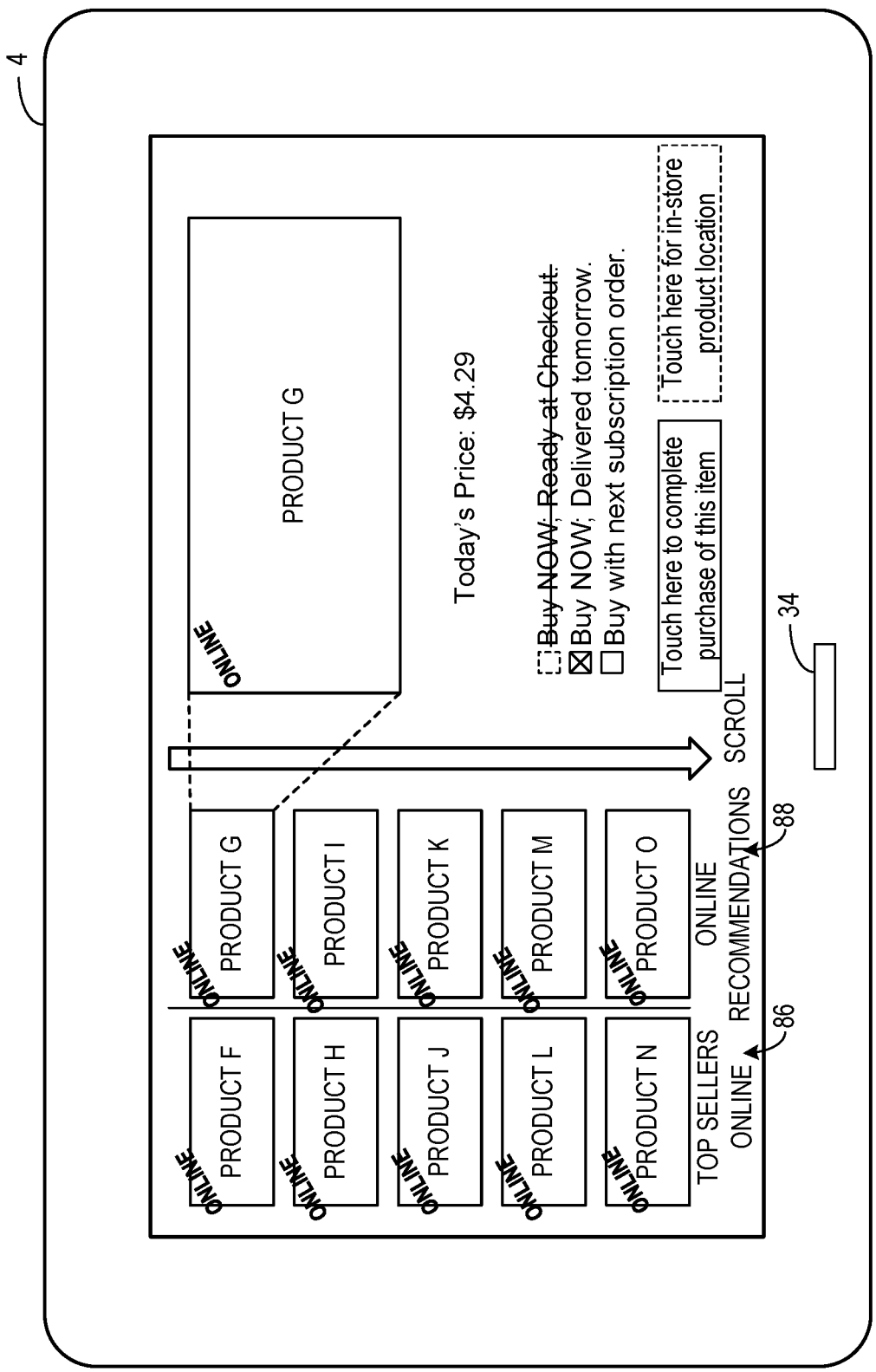

FIGS. 3A-C illustrate three embodiments of terminal 4. In each of the embodiments, terminal 4 comprises a touch screen device, associated with a product category, configured to: present a subset of products within the product category, the subset of products within the product category being determined according to an algorithm that may take into account a profile of a shopper interacting with the terminal, a location of the terminal inside the physical merchant store, and products that are located in proximity to the terminal, and receive a shopper selection associated with at least one of the products in the subset of products within the product category for fulfillment. The algorithm may also be based on a sales history associated with the profile of the shopper, and other factors discussed herein. In some embodiments, the algorithm may be based on an overall sales history associated with profiles of multiple shoppers, preferences of the shopper, the current position of the shopper relative to the terminal and products within the physical merchant store, inventory data, sales volume, the demographic profile of the shoppers who typically frequent the physical merchant store, random selection, payments made by advertisers, and other factors. In other embodiments, the algorithm may preferentially choose sponsored or promoted products within the product category to present to the shopper. The algorithm may be based on a saleable inventory in a stock portion of the physical merchant store or a warehouse. With the terminal 4, a shopper can select from a selection of products that were not included in the merchandise display, allowing the shopper to scroll through them to view a broadening selection of products, until the shopper makes a selection and indicates the desired purchase mode. In the preferred embodiment, the touch screen device is provided by the retailer, but in other embodiments, the shopper may provide the touch screen device with an application that is provided by the retailer. Terminals are configured to display detailed information, including in-store product location information, and purchase prices of the products for sale within a product category that is assigned to the terminal. The purchase price that is displayed on the terminal may be determined at least in part by the identity of the shopper interacting with the terminal. The terminal interface may also have other features to facilitate sharing of browsed products by the shopper.

The presentation of the subset of products within the product category may take various forms. For example, as illustrated in FIG. 3A, the products may be represented by icons that a user may scroll through in an intuitive, user-friendly GUI to easily identify the products that are in an in-store inventory and those that are available online. Users may even be able to identify products within the in-store inventory that are currently located on the shelves and merchandise displays of the physical merchant store, located within a stock portion of the physical merchant store, located within a local warehouse situated in proximity to the physical merchant store, or alternatively located within a remote warehouse. The GUI of FIG. 3A is configured to display in a first region 70 including a ranked list of products is generated based related to the position of the terminal relative to other product categories within the store, and to display in a second region 72 a ranked list of products that is generated without regard to the location of the terminal relative to other product categories in the store. In the first region 70 of FIG. 3A, the GUI displays products that are available only online, and provides a graphical indication 74 of the online availability in the form of a label ONLINE on each product icon 76. The second region 72 displays products that are top sellers in the store, and also provides an indication 74 in the form of a label ONLINE, IN STOCK, or ON SHELVES, to indicate to the user the manner in which the product is available for purchase. Selection of a particular product icon such as Product G, causes the icon to be displayed in a large format, and enables the user to select a purchasing option, as discussed below.

Alternatively, as illustrated in FIG. 3B, in the intuitive, user-friendly GUI, the products may be digitally represented as a 2 or three dimensional virtual reality rendering corresponding to the product layout of a physical merchant store. The product layout may be a representation of a merchandise display, which a user may interact with to easily identify the products that are in an in-store inventory and those that are available online. In the depicted embodiment, the ON SHELF inventory is represented in region 80, whereas the IN STOCK inventory (i.e., inventory that is in-stock but not on shelves) is represented in region 82 and the ONLINE inventory is represented in region 84.

In contrast to the embodiments illustrated in FIGS. 3A and 3B, which display products available on shelf, in store, and online, FIG. 3C illustrates an embodiment of the GUI of terminal 4 configured to display only products that are available online, and not to display products that are available in store. In this embodiment, top online sellers are displayed in a first region 86 and recommended products, which are generated based on the position of the terminal relative to adjacent products and/or product categories in the store, and optionally the shopper profile, are displayed in online recommendations region 88. In this embodiment, the BUY NOW option is crossed out and not selectable.

In one specific use case scenario, a terminal and merchandise display may be provided adjacent to pasta products in a shopping environment in a grocery store. The terminal may be associated with the pasta product category, configured to choose and present a subset of products within the pasta product category, and receive a shopper selection associated with at least one of the products in the subset of products for fulfillment. The merchandise display may include the top selling brands of spaghetti, while the terminal allows shoppers to browse and purchase less popular brands of spaghetti. If the shopper profile indicates that shopper has a sales history of purchasing only generic brands of pasta sauce, then the subset of products may include generic pasta sauce. If the terminal is located in proximity to cheese products, then the subset of products may include cheese products. If the terminal is located in the organic foods department, then the subset of products may include only organic pasta sauce and cheese products. Alternatively, if the overall shopper demographic in the store overwhelmingly prefers pasta product A, then pasta product A may be preferentially included in the subset of products. A shopper selecting pasta product A on the terminal display may see detailed information about pasta product A, including nutritional facts, ingredients, sample recipes, coupons and deals, and pricing information. Profiles of multiple products may be displayed side-by-side on the display to allow for convenient comparison shopping on the terminal 4.

The terminal 4 may be further configured to handle purchases in three modes, but only after the request to purchase and receive purchased products during the current visit is accepted when the one or more products selected by the shopper is confirmed to be in a saleable inventory in a stock portion of the physical merchant store. In the first mode, the terminal receives a shopper request to purchase and receive during current visit at least one of the products selected by the shopper. Once the purchase order is transmitted through the computer network of the physical merchant store, the at least one of the products selected by the shopper are retrieved from stock by robotic machine or by store personnel in the stock portion of a physical merchant store, a local warehouse that is located in proximity to the physical merchant store, or a remote warehouse. As illustrated in FIG. 3C, if the selected item is not available for purchase during the current visit, the first mode is not be available to the shopper for selection.

In reference to FIG. 3C, if the request to purchase and receive purchased products during current visit is rejected when the at least one of the products selected by the shopper is not in a saleable inventory stored in a stock portion of the physical merchant store, or if the system is configured to only display products that are available online, then the shopper may choose the second or third modes, by selecting the appropriate selector (e.g., checkbox). In this manner the terminal receives the shopper request to purchase for later delivery (second mode) or to purchase with the predetermined subscription order (third mode) the at least one of the products selected by the shopper. In the second mode, the terminal receives a shopper request to purchase for later delivery at least one of the products selected by the shopper. This mode is intended to be one of two modes that the shopper might select if a selected product is not available for purchase during the current visit. The shopper would be able to designate a destination for delivery, choosing to pick up the product at a home or business address, in the current physical merchant store, or another physical merchant store. The shopper would also be able to choose a mode of delivery, choosing various shipping speeds and services.

In the third mode, the terminal receives a shopper request to purchase with a predetermined subscription order at least one of the products selected by the shopper. This mode is intended to be one of two modes that the shopper might select if a selected product is not available for purchase during the current visit. If a shopper already has a subscription order in place, in which selected products are automatically purchased and delivered at a regular schedule, a shopper may choose to bundle the delivery of the at least one or more products in the current purchase into the next delivery of the existing subscription order.

Shoppers may identify themselves through a card reader that is provided on the terminal 4, including a means for reading shopper identifier information from a magnetic strip or a microchip that may be located on the shopper's card. If the shopper has a card that is associated with a shopper profile, the user may swipe the card through the card reader 34 or scan a microchip, thereby providing a shopper identifier to the terminal. Thus, a profile of the shopper can be authenticated using a card with a magnetic stripe or a microchip. Other embodiments of the terminal may omit the card reader 34. For example, in other embodiments, the shoppers might be authenticated by entering a unique alphanumeric sequence, such as a user ID and password, or use other identification devices such as QR code reader, fingerprint reader, iris reader, wireless detection of an RFID card of the shopper containing a code, Bluetooth or other wireless communication with a smartphone or other device storing the shopper identifier, etc. Authentication systems may also accommodate secure mobile payment services, such as APPLE® PAY, that let mobile devices wirelessly communicate with point of sale systems to authenticate the shopper.

A shopper may also be presented on the terminal 4 with advertisements that include suggestions for products that the shopper may be interested in, coupons for products, and special offers. The presented advertisements may be based on a sales history associated with the profile of the shopper, sales history associated with profiles of multiple shoppers, the demographic profile of the shoppers who typically frequent the physical merchant store, preferences of the shopper, other information related to the shopper, random selection, payments made by advertisers, and other factors. In other embodiments, the advertisements may preferentially present saleable inventory in a stock portion of the physical merchant store or a warehouse.

Figure 4:
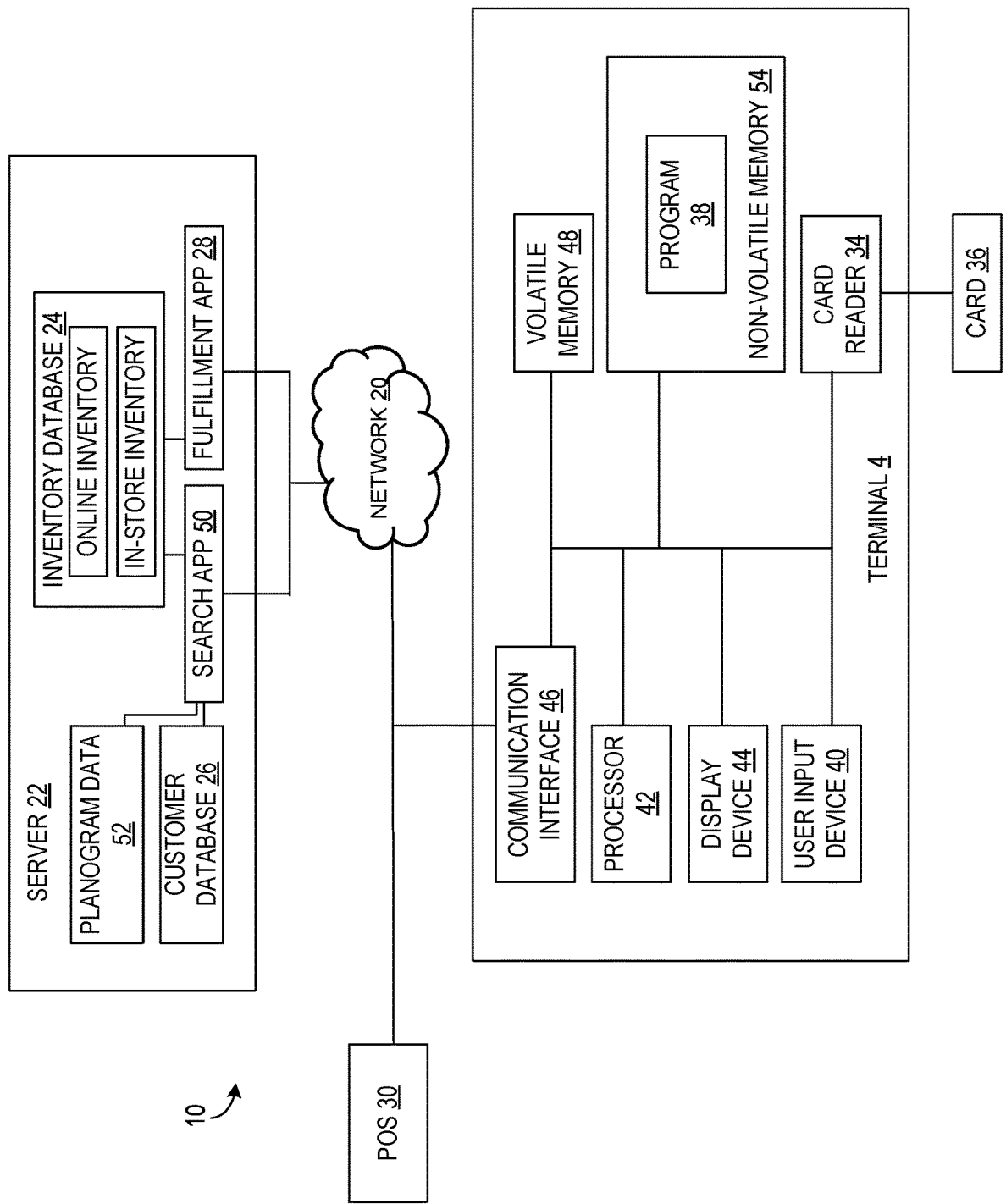
FIG. 4 shows a schematic depiction of a computer network of the present invention.

Referring to FIG. 4, an interactive transaction system 10 is depicted. The terminal 4 may be a touch screen computing device typically including a processor 42 linked by a communications bus to a user input device 40 (e.g. touch screen, keyboard, or mouse), display device 44 (e.g. touch screen or monitor), communication interface 46 (e.g. network card), volatile memory 48 (e.g. RAM), non-volatile memory 54 (e.g. flash memory, hard drive, ROM, etc.) storing a program 38, and a card reader 34 configured to read corresponding cards 36, such as cards with magnetic stripes or microchips. Processor 42 is configured to execute a program 38, stored in the non-volatile memory 54, using portions of volatile memory 48 and non-volatile memory 54. Communication interface 46 is typically configured to connect to computer network 20 to establish respective communications links with the interactive transaction system 10 and the server 22. It will be appreciated that there may be a variety of intermediary devices that may facilitate the connection between the terminal and the server and the point of sale. For example, a routing device (not shown) positioned within or adjacent to the shopping environment may be configured to receive signals (e.g. wired/wireless) from the server 22. The routing device may be further be configured to relay the signals over a network (e.g., VPN) to the terminal 4. In less preferable embodiments, the functionality of the terminal 4 may also be distributed among multiple computing devices. For example, a shopper's personal tablet computing device may also function as a terminal 4.

The server 22 may provide an inventory database 24 comprising an online inventory and an in-store inventory, customer database 26, planogram data 52, a search application 50, and a fulfillment application 28. The inventory database 24, closely integrated with the search application 50 and the fulfillment application 28, is ideally comprehensive, covering all products that are in a saleable inventory in a stock portion of the physical merchant store, a local warehouse in proximity to the physical merchant store, or a remote warehouse. In certain embodiments, saleable inventory that requires a longer delivery time to reach the shopper may also be included, such as an online inventory. The inventory database 24 may have precise, real time information about each product in the saleable inventory, including quantities in stock, physical location of each item, detailed product information, purchase histories, shipping histories, and other pertinent information. Automated systems, such as RFID tags, may be employed to facilitate the integration of each item into the inventory system for better management. To record the physical location of each item, products may be presented within a virtual store space according to planogram data 52, or a digital layout of the physical merchant store, storing information about the location of each product in the physical merchant store relative to each terminal 4. The planogram data 52, closely integrated with the search application 50, may also be used to store other information in relation to the virtual store space, recording information about shopper foot traffic and shopper interest in each product as monitored by a shopper tracking system.

The customer database 26, closely integrated with the search application 50, may store shopper profiles associated with shopper identifiers, including sales histories, virtual shopping carts, purchase orders, bookmarks, wish lists, and browsing histories. The virtual shopping cart for each shopper is maintained within a customer database 26 that is accessed when the shopper sends a request to purchase and receive at least one of the products selected by the shopper. However, in other embodiments, the virtual shopping cart may be maintained in a customer database 26, or a database that integrates both inventory and customer information.

A fulfillment application 28 calculates a bill for the shopping cart items, or at least one of the products selected by the shopper, and initiates a fulfillment process. At the terminal 4, the fulfillment application 28 accepts a shopper selection of a mode of purchase and finalizes a purchase. If a shopper picked up at least one item in a merchandise display for purchase, the shopper checks out the item at the point of sale 30, which is connected to and communicates with each terminal 4 and the network 20 and has full access to the customer database 26 and inventory database 24 through the network 20. If a shopper has purchased at least one item through the terminal 4 to purchase and receive during the current visit, the shopper receives the item at the point of sale 30 from a robotic machine or store personnel that has retrieved the ordered and purchased item from a stock portion of the physical merchant store, a local warehouse in proximity to the physical merchant store, or a remote warehouse. If the shopper has chosen to purchase for later delivery at the point of sale 30 at least one item, then the shopper also receives the item at the point of sale 30. In other embodiments, the point of sale 30 may be conceived as store personnel with mobile computing devices that function as points of sale.

Figure 5:
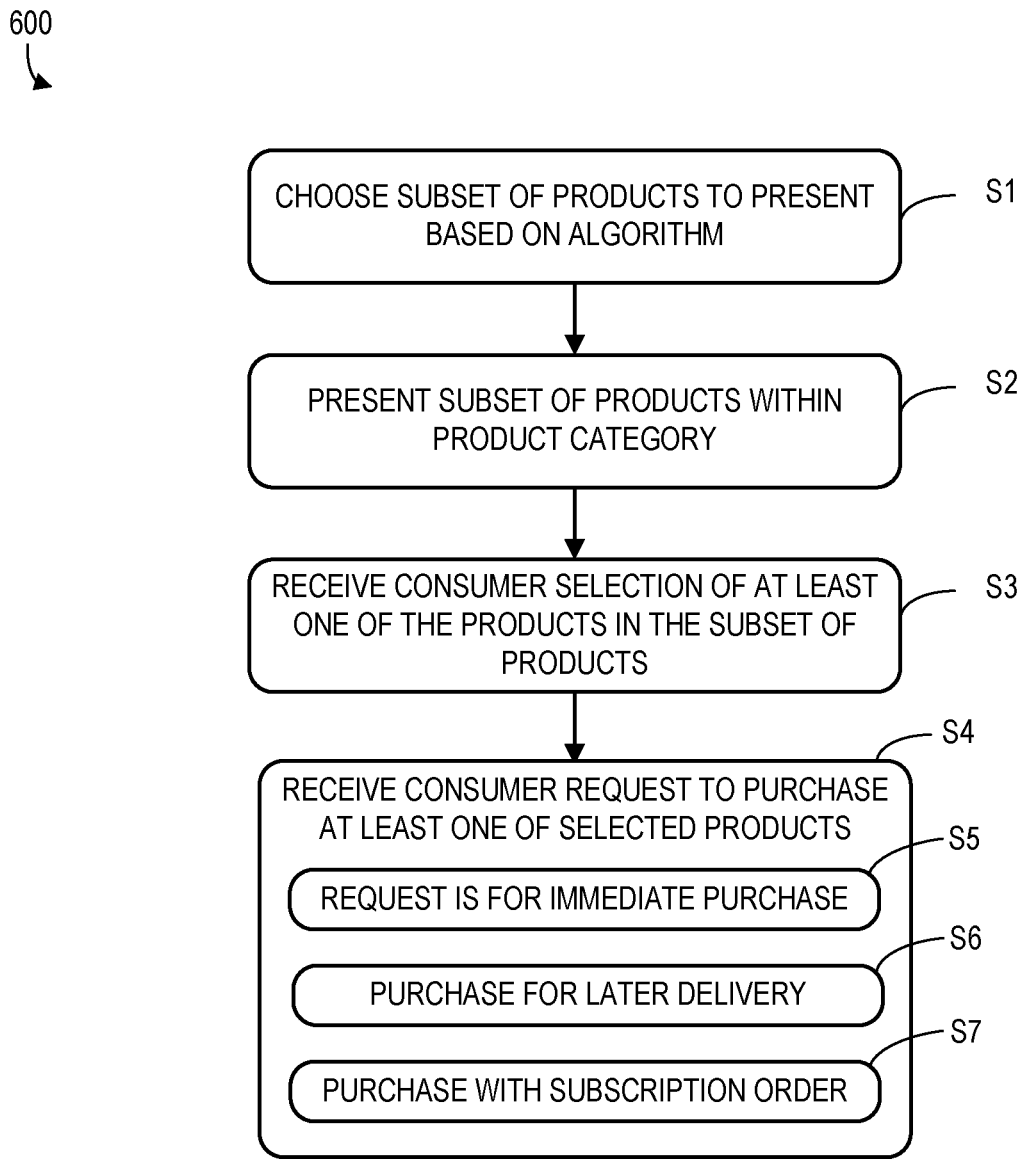
FIG. 5 is a flowchart of a method according to one embodiment of the present invention.

With reference to FIG. 5, at step S1, the method 600 may include choosing a subset of products to present based on an algorithm. At step S2, the device presents a subset of products within the product category. At step S3, the consumer selects at least one of the products in the subset of products. Following step S3, consumer reaches a decision-making point at step S4, where the consumer must make a decision on purchasing the selected at least one of the products. Consumer may choose to purchase and receive at least one of selected products during current visit (step S5), purchase for later delivery at least one of the selected products (step S6), or purchase with a subscription order at least one of the selected products (step S7). These options are not intended to be limiting embodiments—other modes of purchase may be provided for the consumer at decision-making point step S4.

Figure 6:
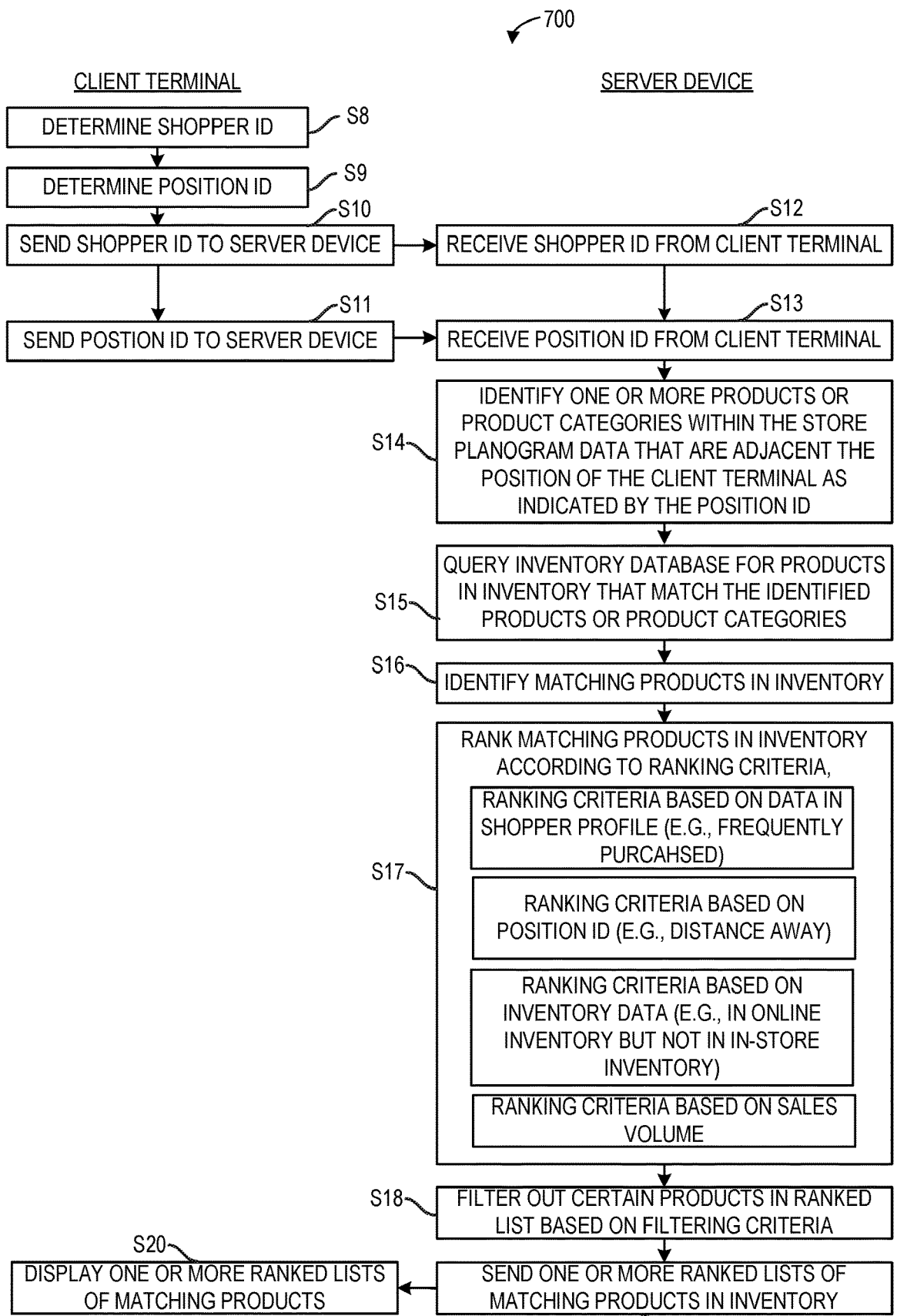
FIG. 6 is a flowchart of a method according to another embodiment of the present invention.

With reference to FIG. 6, a method 700 according to another embodiment is depicted. The method 700 may include determining a shopper identifier (step S8), determining a position identifier (step S9), and sending the shopper identifier (step S10) and position identifier to a server device (step S11). The server device receives the shopper identifier (step S12) and position identifier from the client terminal (step S13). The search application within the server device identifies one or more products or product categories within the store planogram data that are adjacent to the position of the client terminal as indicated by the position identifier (step S14). The search application sends a search query to the inventory database to find matching online and/or in-store inventory that matches the identified products or product categories (step S15). Once the matching products in the inventory are identified (step S16), products in the inventory are rank matched according to ranking criteria (step S17). For example, the ranking criteria may be based on data in the shopper profile (e.g., frequently purchased products), position ID (e.g., distance from in-store products), inventory data (e.g., online inventory and in-store inventory), or sales volume (e.g., top seller search). The search application may filter out certain products in ranked list based on filtering criteria (step S18). Filtering criteria are not particularly limited and may include product category, customer ratings, popularity, relevance, availability, manufacturer, brand, vendor, and product features. The filtering criteria may be store specified (e.g., a manager of a store desires to stop promoting a particular product because supplies are low) or customer specified (e.g., a customer indicates that they would like to stop receiving product recommendations for a product they do not purchase, such as Brussels sprouts. Once filtering is complete, the one or more ranked lists of matching products in the inventory may be sent to the terminal (step S19) to be displayed (step S20).

Figure 7:
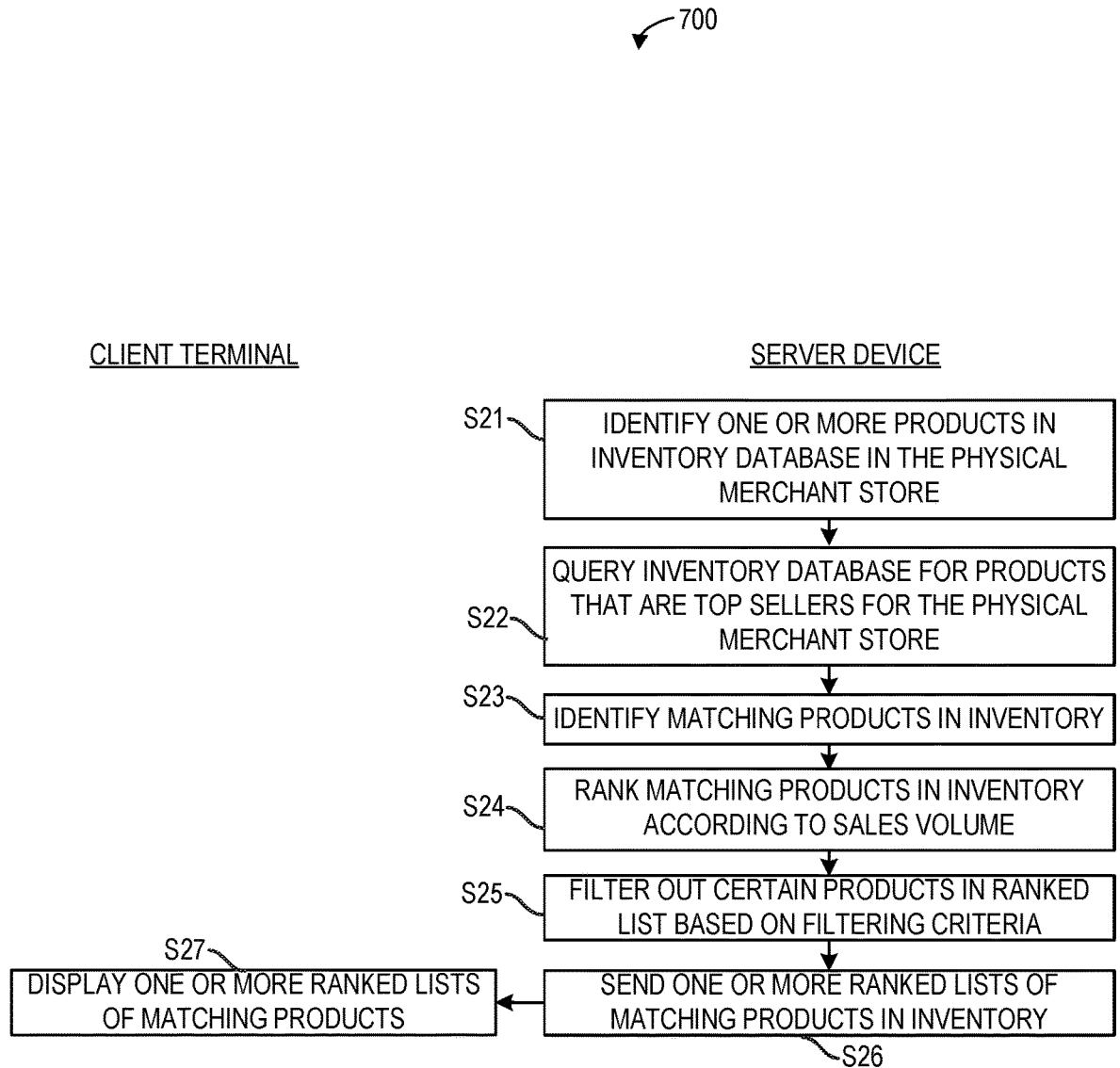
FIG. 7 is a flowchart illustrating additional steps of the method of FIG. 6.

With reference to FIG. 7, the method 700 of FIG. 6 may continue with steps S21 through S27, which may be performed following or in parallel with steps S1-S20. In steps S21 through S27, in contrast to determining a subset of products within a product category according to an algorithm that takes into account a profile of a shopper interacting with a terminal, a location of the terminal inside the physical merchant store, and products that are located in proximity to the terminal, only the products that are top sellers for the physical merchant store are determined and then displayed in a dedicated area of the display of the terminal, as illustrated in the "top in-store sellers" column in FIG. 3A and the "top sellers online" column in FIG. 3C. Functioning in parallel with the method according to FIG. 6, software on the server device, such as the search application, identifies one or more products in the inventory database in the physical merchant store (step S21). The search application sends a search query to the inventory database to find products that are the top sellers for the physical merchant store (step S22). Once the matching products in the inventory are identified (step S23), products in the inventory are rank matched according to ranking criteria (step S24), which is typically dependent on sales volume to show the top selling products. As in the method of FIG. 6, the search application may filter out certain products in the ranked list based on filtering criteria (step S25). Filtering criteria are not particularly limited and may include item margins, product category, customer ratings, popularity, relevance, availability, manufacturer, brand, vendor, and product features. One or more ranked lists of matching products in the inventory may be sent to the terminal (step S26) to be displayed (step S27). It will be appreciated that, unlike the method of FIG. 6, shopper identifiers, position identifiers, the position of the client terminal, and planogram data are not taken into consideration when the rank lists are prepared for display on the terminal. In this manner, the shopper may view both recommendations that are relevant to the place in which the shopper is using the terminal, and which are relevant to the shopper's purchase history and preference as stored in the shopper profile, as well as recommendations that are based upon items that are selling well in the store, independent of whether they are relevant to the surrounding products or to the shopper's profile.

FIGS. 8-14 illustrate embodiments of an interactive transaction system that processes captured images of a shopper to classify the shopper as being interested in a particular mode of interaction with a terminal placed in the shopping environment, and that modifies a graphical user interface of the terminal according to the anticipated mode of interaction.

Figure 8:
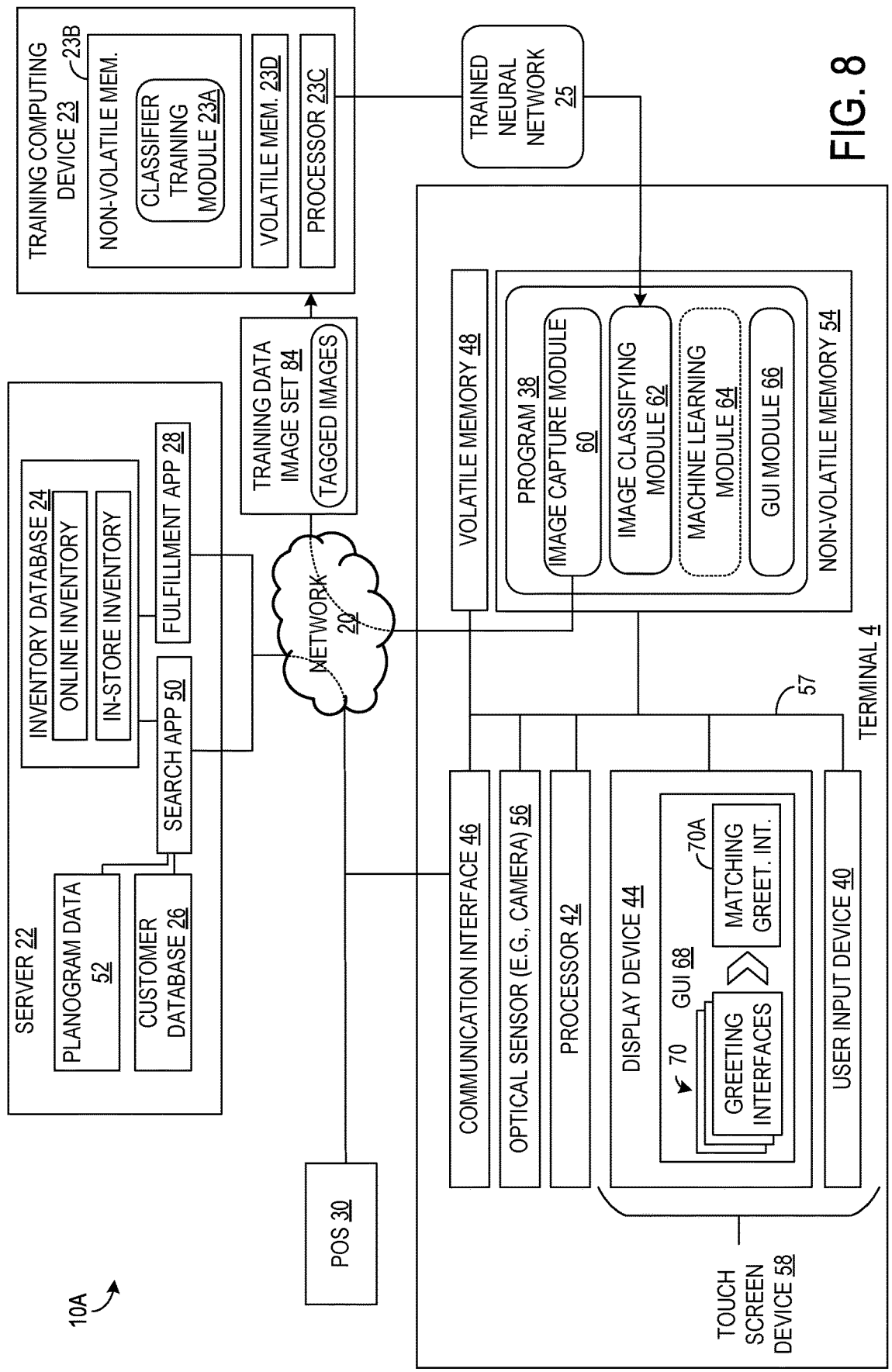
FIG. 8 shows a schematic depiction of an interactive transaction system according to another embodiment of the present invention, which is configured to select a matching greeting interface from among a plurality of candidate greeting interfaces to display to the user based on processing of captured images of the shopper.

Referring now to FIG. 8, an embodiment of an interactive transaction system 10A is depicted. Components of interactive transaction system 10A are similar to components of interactive transaction system 10 described above, except where described differently below. Interactive transaction system 10A includes a terminal 4 that is located inside a physical merchant store 1 adjacent or in proximity to a merchandise display 7, such as shown in FIG. 1. Continuing with FIG. 8, terminal 4 may include a touch screen device 58 and an optical sensor 56 such as a visible light camera, coupled by a communications bus 57 to a processor 42. The optical sensor 56 may also include a depth camera, configured to detect a distance of the shopper from the depth camera based on emission of structured patterns of infrared light and detection of the position of the reflections of those patterns on objects in the environment. Other techniques, such as measuring the time-of-flight from emission to detection to determine distance, and other wavelengths, such as ultraviolet light, may also be employed by the depth camera.

Processor 42 is configured to execute a program 38, stored in non-volatile memory 54, using portions of volatile memory 48 and non-volatile memory 54. Program 38 includes an image capture module 60, image classifying module 62, a machine learning module 64, and a graphical user interface (GUI) module 66. The detailed functions of each of the aforementioned modules will be discussed in further detail below.

The touch screen device 58 includes a display device 44 and a user input device 40, such as a capacitive sensor enabling touch input on the display device. GUI module 66 of program 38, when executed by processor 42 is configured to cause the touch screen device 58 to display a graphical user interface 68 on display device 44. The graphical user interface 68 includes a plurality of greeting interfaces 70. Each of the greeting interfaces 70 typically occupies an entire visible screen of the display device 44 when displayed. That is, the GUI module 66 is typically configured to display only one of the greeting interfaces 70 at a time on display device 44. Alternatively, each of the greeting interfaces may occupy substantially all of the display device when displayed, such as 85%, 90% or 95% of the display device. Examples of the greeting interfaces 70 are illustrated in FIGS. 10-13, discussed below.

Returning to FIG. 8, program 38 may utilize a variety of factors in determining which of the greeting interfaces 70 to display. For example, among the greeting interfaces 70, a matching greeting interface 70A may be selected for display by image classifying module 62 based on captured images of the shopper, as discussed below. Thus, for example, one or more processors 42 of terminal 4 may be configured to classify the images as belonging to a matching greeting interface 70A of the plurality of greeting interfaces 70 using a trained neural network 25 accessible to the image classifying module 62.

Training of the trained neural network 25 will now be described in brief. A more detailed explanation is made below in reference to FIGS. 14-15. In one example training scenario, training of the trained neural network 25 occurs as follows. In a training phase prior to run-time of the image classifying module 62, images of shoppers are captured by the optical sensor 56 and image capture module 60 of terminal 4 as the each shopper approaches the terminal while an initial greeting interface (shown at 70B in FIG. 13) is displayed, which also may be referred to as a training greeting interface when it is used in training phase. The initial (or training) greeting interface 70B displays choices for the shopper to select one of the plurality of greeting interfaces 70.

As shoppers select one of the plurality of greeting interfaces, the images of the shopper approaching and interacting with the terminal 4 are collected and tagged with the shopper's choice of greeting interface 70. These tagged images form a training data image set 84, which is sent from the terminal 4 to a training computing device 23 for training of the classifier. The training computing device 23, may, for example, be off-site in a server farm, or at another suitable location connected by network 20 to the terminal 4. The training computing device 23 comprises a classifier training module 23A stored in non-volatile memory 23B, which may be executed by processor 23C using portions of volatile memory 23D. In this way, the trained neural network 25 that is used by the terminal 4 at run-time has been trained on a training data image set 84 of shopper images of tagged training images 25 that have been tagged with one of the plurality of greeting interfaces 70 selected by the shopper 12 in each image. Using the captured images of the shopper 12, the trained neural network 25 can predict, at run-time, the matching greeting interface 70A to present to the shopper 12.

A machine learning module 64 may be configured to gather feedback from the usage of the trained neural network 25 by the image classifying module 62 during run-time. This feedback may be used by machine learning module to further train or enhance the trained neural network classifier, either directly on the terminal 4, or by sending the feedback to training device 23 for retraining of the trained neural network based on the feedback. Such feedback may include, primarily, whether the user interacted with the matching greeting interface 70A (indicating the prediction was accurate) or instead whether the user opted to choose another greeting interface 70 to interact with instead of matching greeting interface 70A after its display (indicating the prediction was inaccurate). It will be appreciated that alternatively, the classifier training module 23A may be executed on the terminal 4, or server 22, for example, and further machine learning module 64 may alternatively be executed on training computing device 23 or server 22, for example.

Continuing with FIG. 8, terminal 4 may communicate with server 22 to exchange data for accomplishing various functions. For example, the processor 42 of the interactive transaction system 10A may send a request via the network 20 to the server 22 to determine an identity and position of each of the types of physical products positioned on the adjacent merchandise display, products related to these physical products, and top-selling products in the merchant store. The processor 42 may also send a request to the server 22 whenever the shopper inputs a search for one or more products. The server 22 may include an inventory database 24 including online inventory and an in-store inventory, a customer database 26, planogram data 52, a search application 50, and a fulfillment application 28. The inventory database 24 may have information about each product in the saleable inventory, including quantities in stock, physical location of each item, detailed product information, such as product category, price, brand, purchase histories, shipping histories, and other pertinent information. The planogram data 52 may provide information as to products located adjacent or in proximity to the terminal 4.

Figure 9:
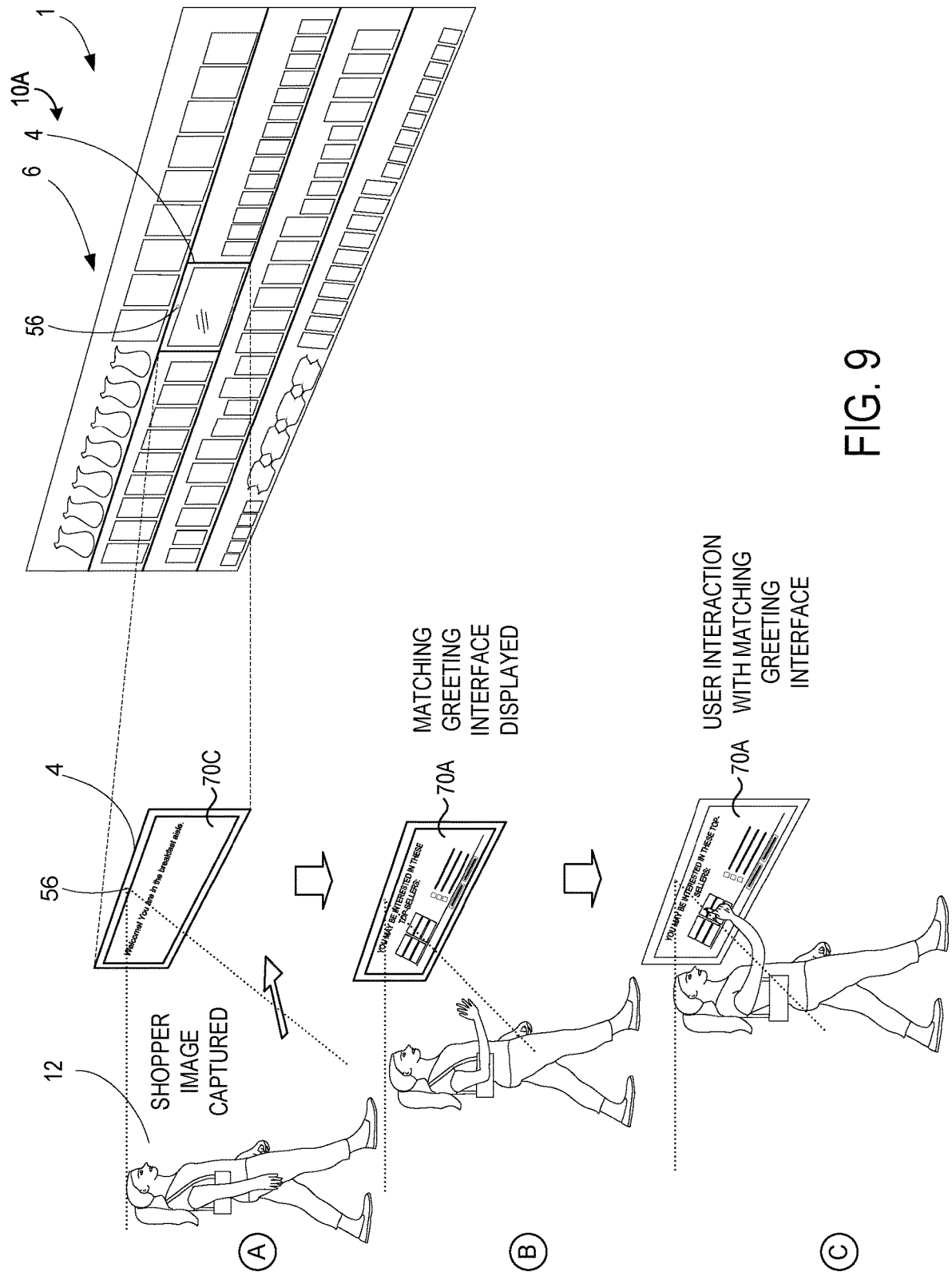
FIG. 9 shows a schematic depiction of a use case scenario of the interactive transaction system of FIG. 8.

FIG. 9 illustrates an example use case scenario in which a shopper approaches the terminal 4 of the transaction system 10A. As depicted, terminal 4 is located in a store aisle 6 of shopping environment 1. For ease of illustration, terminal 4 is shown in a partially exploded view on the left side of FIG. 9. In the depicted scenario, as shown in FIG. 9 at (A), the optical sensor 56 of terminal 4 captures a plurality of images of the shopper 12 as the shopper approaches the terminal 4. While only one optical sensor 56 is shown, it will be appreciated that multiple optical sensors 56 may be used to capture images of the shopper from multiple angles. Executing the image capture module 60 of program 38, the processor 42 is configured to receive a plurality of images of the shopper over a predetermined period of time. The predetermined period of time may be a duration from the time the optical sensor 56 detects the presence of the shopper approaching the terminal 4 to the time the shopper is no longer visible within the field of view of the optical sensor 56. Alternatively, the predetermined period of time may be from the time the shopper is detected within a predetermined distance of the terminal, as calculated based on image data or a depth camera provided in the terminal 4. Other predetermined periods of time may also be used. In other embodiments, it is conceivable that a single image captured of the shopper and the image may be captured at a predetermined point in time rather than over a predetermined period of time.

While approaching the terminal 4, the shopper 12 may exhibit certain behaviors or physical attributes that are evident in the appearance of the shopper 12, such as an eye gaze, a facial expression, a hand gesture, a head pose, an arm positioning, a body pose, speed of walking, possession of articles such as products or a shopping cart, etc., which may be indicative of a preferred mode of interaction of the shopper 12 with terminal 4. The optical sensor 56 captures images of the shopper 12 exhibiting the physical attributes and transmits the images to the processor 42 to classify the images. The interactive transaction system 10A may analyze computer recognizable features in the appearance of the shopper in the captured images to predict a mode of interaction with the terminal 4 estimated to be preferred by the shopper 12.

As shown in FIG. 9 at (A), while approaching the terminal 4, the shopper 12 may be greeted with a currently displayed greeting interface 70C with general information, such as a branding message or a message inviting the shopper to approach the terminal. The example message displayed on currently displayed greeting interface 70C in FIG. 9 is "Welcome. You are in the breakfast aisle."

As shown in FIG. 9 at (B), based on the output from the image classifying module 62, the processor 42 is configured to modify the graphical user interface 68 on the touch screen device 58 to display the matching greeting interface 70A. Modifying the graphical user interface 68 includes changing the currently displayed greeting interface 70C to the matching greeting interface 70A. The graphical user interface 68 changes from the initial greeting interface 70C (FIG. at 9A) to the matching greeting interface 70A upon determination by the processor 42, executing program 38, of the correct matching greeting interface 70A to present to the shopper 12. As shown in FIG. 9 at (B), by executing the image classifying module 62 of program 38 at run-time (i.e., at the time of interaction with the shopper in the store), the processor 42 is configured to classify the images as belonging to a matching greeting interface 70A of the plurality of greeting interfaces 70 using a classifier in the form of trained neural network 25, which is imported into and included within the image classifying module 62.

As shown in FIG. 9 at (C), once presented with the matching greeting interface 70A, the shopper 12 has the option to interact with the terminal 4. The interaction of the user will vary with the type of matching greeting interface 70A presented.

Figure 10:
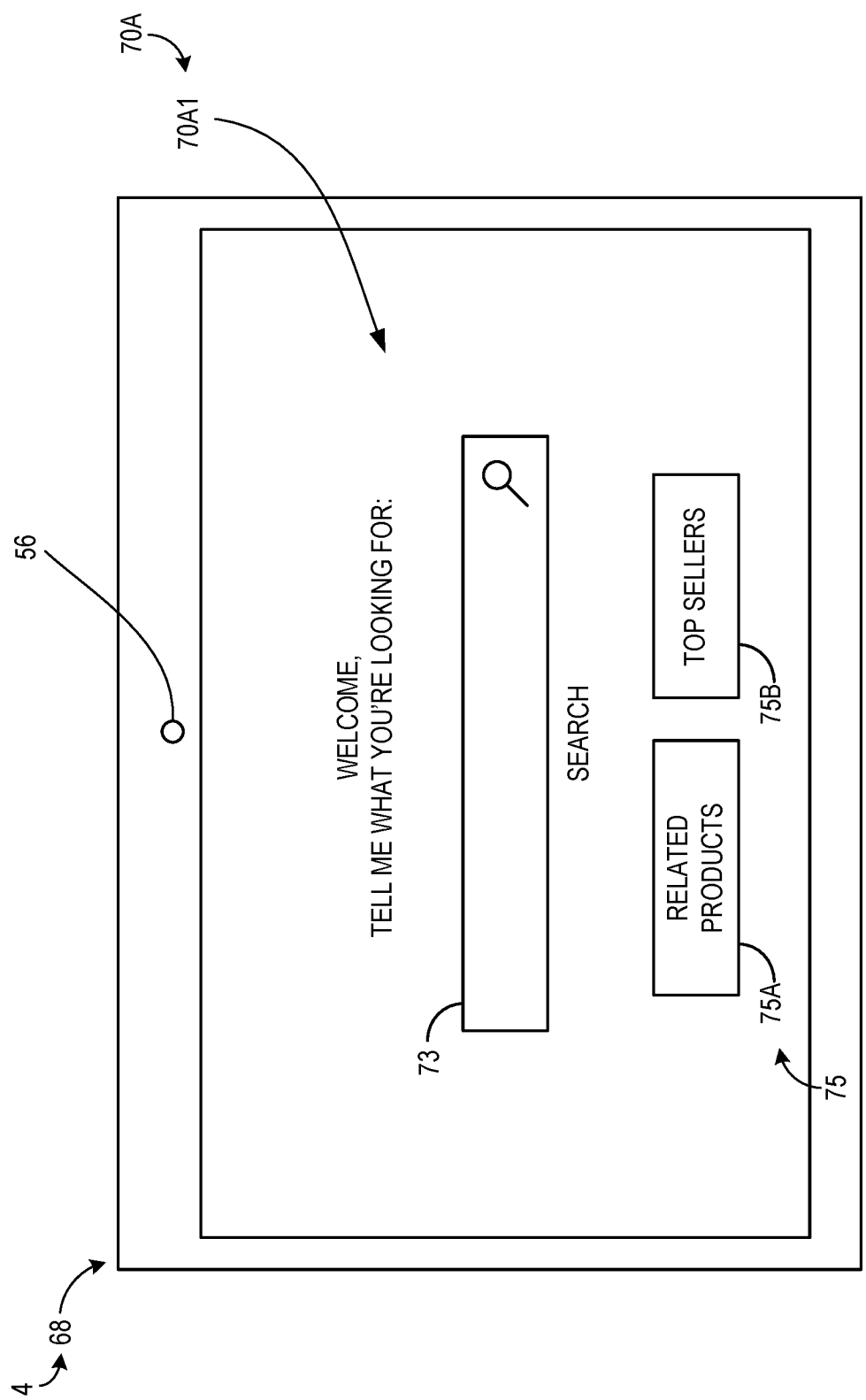
FIG. 10 shows a schematic depiction of a search interface of the interactive transaction system of FIG. 8.
Figure 11:
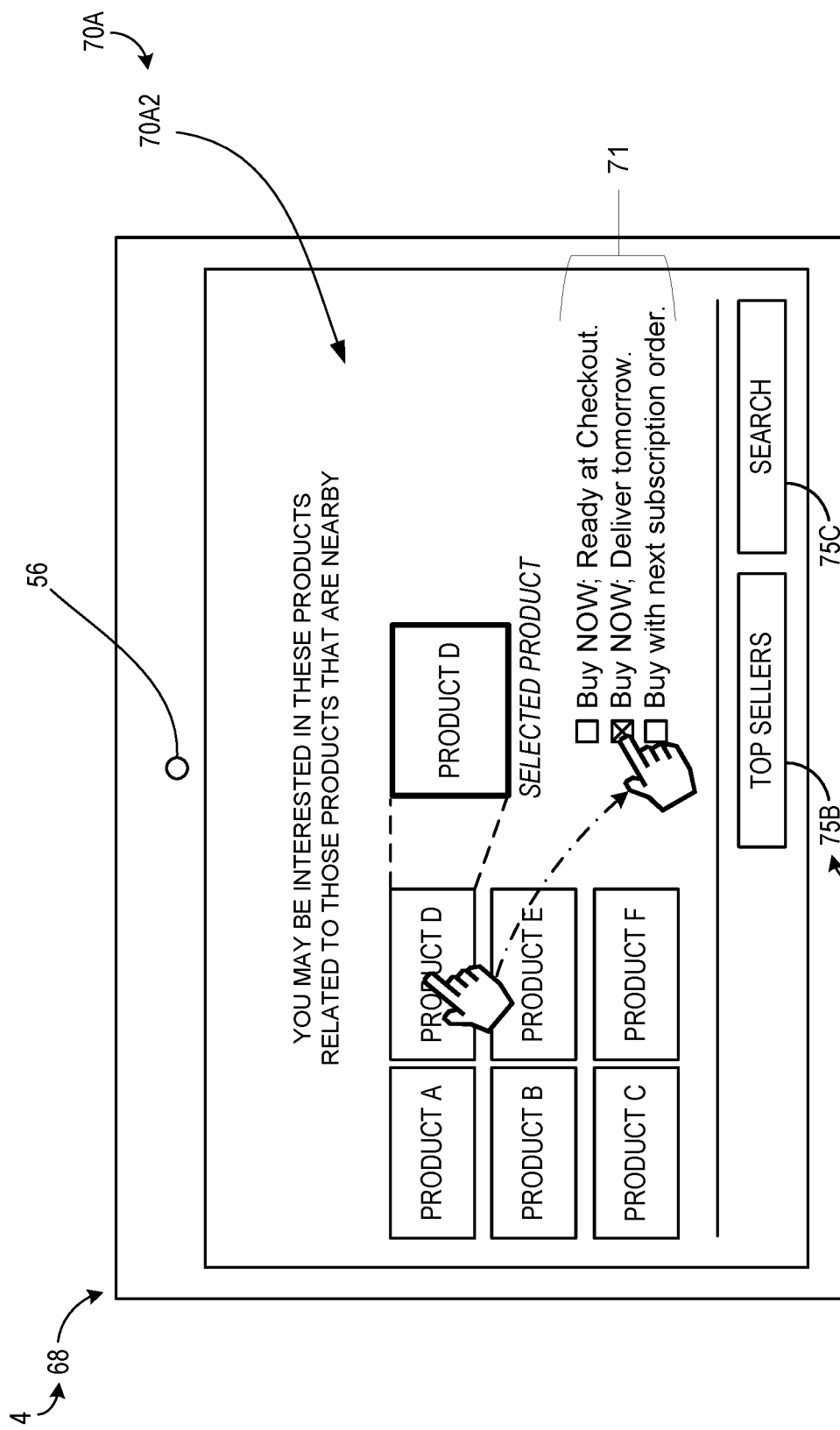
FIG. 11 shows a schematic depiction of a related products interface of the interactive transaction system of FIG. 8.
Figure 12:
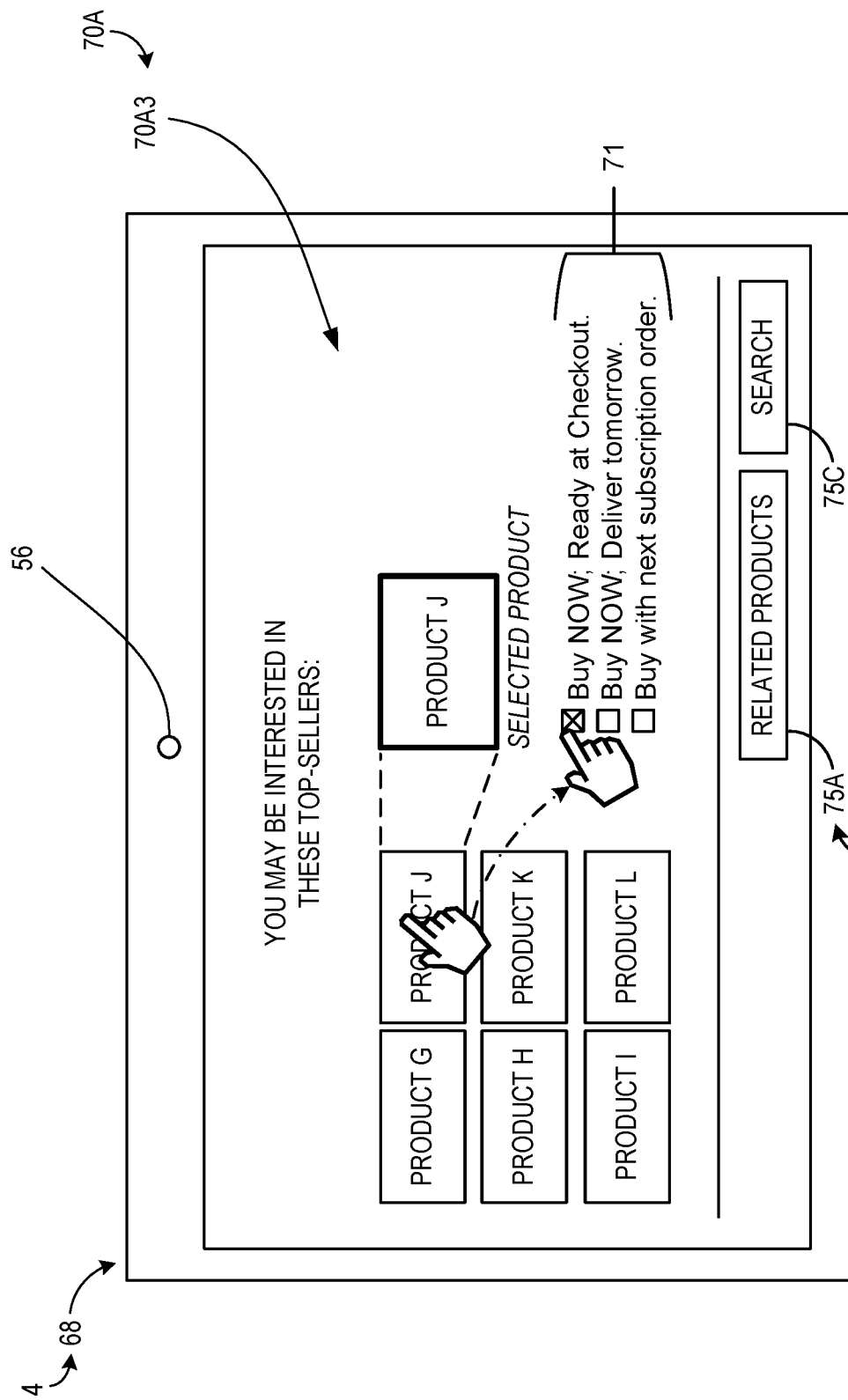
FIG. 12 shows a schematic depiction of a top sellers interface of the interactive transaction system of FIG. 8.

Three examples of the plurality of greeting interfaces 70 that may be selected as matching greeting interface 70A are illustrated in FIGS. 10-12. For example, the matching greeting interface 70A may be a search interface 70A1 for searching for a product via a keyword search tool as shown in FIG. 10, a related products interface 70A2 that displays a plurality of selectable product icons that are related to physical products positioned on the adjacent merchandise display as shown in FIG. 11, or a top seller interface 70A3 that displays selectable product icons for products that are most-purchased by shoppers in the physical merchant store as shown in FIG. 12. The matching greeting interface 70A allows the merchant to personalize the shopping experience for the shopper and save the shopper time, which may have the beneficial effect of increasing the probability of making a sale.

FIG. 10 illustrates the terminal 4 displaying on the touch screen device 58 a matching greeting interface 70A of graphical user interface 68 in the form of the search interface 70A1 for searching for a product via a keyword search tool. In this case, the search interface 70A1 includes a search input field 73 for receiving a search term. A user may enter a search query into the search input field to initiate a computerized search for a product. The search query is received by the terminal 4 and sent to search application 50 at server 22 for processing, or alternatively is processed by a local instance of the search application 50 executed locally on terminal 4. Search application 50 may return a ranked list of matching products, and their location in-store or a link to purchase on-line. Thus, the shopper may conveniently perform a search for a particular product right at the terminal 4. Using the matching greeting interface 70A for searching, the shopper 12 may enter a suitable search term, such as the product name, brand, category, or description. The shopper's input forms a search query that is sent from the terminal 4, via the network 20, to the search application 50 in the server 22 to cause the search application 50 to search the inventory database 24 for a one or more matching or closely matching products, which are returned from the server 22 as search results responsive to the search query, and displayed on terminal 4. Closely matching product refers to a product that may be in the same product category, brand, price range, location in the store, have similar uses or applications, or have uses in a similar context.

Input selectors 75, including a related products selector 75A and a top sellers selector 75B, are also displayed on search interface 70A1. The first and second selectors 75A, 75B respectively link to the related products interface 70A2 of FIG. 11 and the top seller interface 70A3 of FIG. 12. If the shopper 12 does not prefer the displayed matching greeting interface 70A, the shopper 12 has the option to change the graphical user interface 68 to a display a different greeting interface 70. As shown in FIG. 10, the graphical user interface 68 may further include one or more greeting screen change input selectors 75, each greeting screen change input selector 75 being configured to modify the graphical user interface 68 to display a different greeting interface 70 of the plurality of greeting interfaces upon selection by the shopper 12. For example, the shopper 12 may change the graphical user interface 68 to the related products interface 70A2 by selecting the related products selector 75A or to the top sellers interface 70A3 by selecting the top sellers selector 75B.

Referring to FIG. 11, the terminal 4 may display on the touch screen device 58 a matching greeting interface 70 that presents a plurality of selectable product icons (Products A-F) that are related to physical products positioned on the adjacent merchandise display. FIG. 11 illustrates the terminal 4 displaying on the touch screen device 58 the related products interface 70A2 as the matching greeting interface 70A. Related products interface 70A2 displays a plurality of selectable product icons 77 for Products A-F that are related to physical products positioned on the adjacent merchandise display. A hand of a shopper is schematically illustrated selecting one of the product icons 77A, also referred to as an input selector 77A, for Product D. Accordingly, the selected product icon 77 is graphically indicated as the selected product 79. A purchase selector 71 is provided in the form of radio buttons or checkboxes for each of a plurality of buy options, each buy option having an associated delivery method indicated in the textual description adjacent the buy option. The shopper may select one of the checkboxes in the purchase selector and select the PROCEED selector, to thereby execute the selected buy option 71, which is labelled "BUY NOW; Ready at Checkout." It will be appreciated that the shopper 12 may change the graphical user interface 68 to the top sellers interface 70A3 by selecting the top sellers selector 75B or to the search interface 70A1 by selecting the search selector 75C.

The manner in which the related products (e.g., Products A-F) are selected for display on the related products interface 70A2 will now be described. The plurality of selectable product icons 77 that are related to physical products positioned on the adjacent merchandise display are determined by an algorithm that calculates a correlation score based on data received from a server, the data including product category, purchase history, price range, and brand, and outputs selectable product icons 77 that satisfy a predetermined correlation score criteria, such as the top 6 icons, top 10 scores, etc. This selection algorithm may be executed at the terminal 4, or at the server 22, as desired.

The illustrated buy options are as follows. For example, according to the middle buy option, the shopper 12 may buy now and receive the item the next day via a delivery service. This is an advantageous option when the product may not be immediately available or is bulk and needs to be shipped to the shopper's address. By selecting the uppermost buy option, the shopper 12 can buy now and complete the purchase at the checkout or POS 30. This may be a preferred option when the shopper 12 wants to reserve the product, such as a product in limited supply, and/or have the product delivered to the checkout, e.g. a large object such as a television that is too cumbersome to push around the store while the shopper 12 is still shopping. By selecting the lowermost buy option, the shopper 12 can buy the item with a subscription order. The subscription may include various terms such as an interval (e.g. monthly, bi-weekly, or yearly), a duration (e.g. for 1 year), a price, and a shipping cost. Other terms and promotional benefits may be provided with the subscription. The terms and benefits may be presented to the shopper 12 in one or more subsequent graphical user interfaces after the shopper 12 makes the selection. By providing a convenient subscription option at the terminal 4, the shopper 12 may be encouraged to subscribe for periodic delivery of items selected by the user, which enables the shopper to batch delivery, saving on fees and offering convenience and reliability of a predetermined delivery schedule. A subscription allows the merchant to maintain customer loyalty and a repeated sale of the product.

Referring to FIG. 12, the shopper may be presented with popular or top-selling products in the merchant store via terminal 4. Thus, terminal 4 may display on the touch screen device 58 a matching greeting interface 70A that displays selectable product icons 81 for products that are most-purchased by shoppers or top sellers in the physical merchant store. For example, a plurality of selectable product icons 81 (e.g., for Products G-L) are presented. Similar to the related products interface 70A2 depicted in FIG. 11, the top sellers interface 70A3 provides the shopper 12 with options to complete the transaction and an option to change the matching greeting interface to, for example, the interface that displays a plurality of selectable product icons that are related to physical products positioned on the adjacent merchandise display ("related products" icon) or the interface for searching for a product via a keyword search tool ("search" icon). The shopper 12 may change the graphical user interface 68 to the related products interface 70A2 by selecting the related products selector 75A or to the search interface 70A1 by selecting the search selector 75C.

To summarize these configurations of matching greeting interfaces 70A shown in FIGS. 11 and 12, when the shopper 12 is presented with a matching greeting interface 70A that is the related products interface 70A2 that displays a plurality of selectable product icons 77 that are related to physical products positioned on the adjacent merchandise display (as shown in FIG. 11), or the top sellers interface 70A3 that displays selectable product icons 81 for products that are most-purchased by shoppers in the physical merchant store (as shown in FIG. 12), the matching greeting interface 70 includes an input selector 77A, 81A to select one or more selected products 79, 83, and a purchase selector 71 including at least one buy option to purchase the one or more products, the buy option having an associated delivery method for receiving the one or more products. As described above, the shopper 12 may conveniently use the touch screen device 58 to input or select options to complete a purchase transaction.

Figure 13:
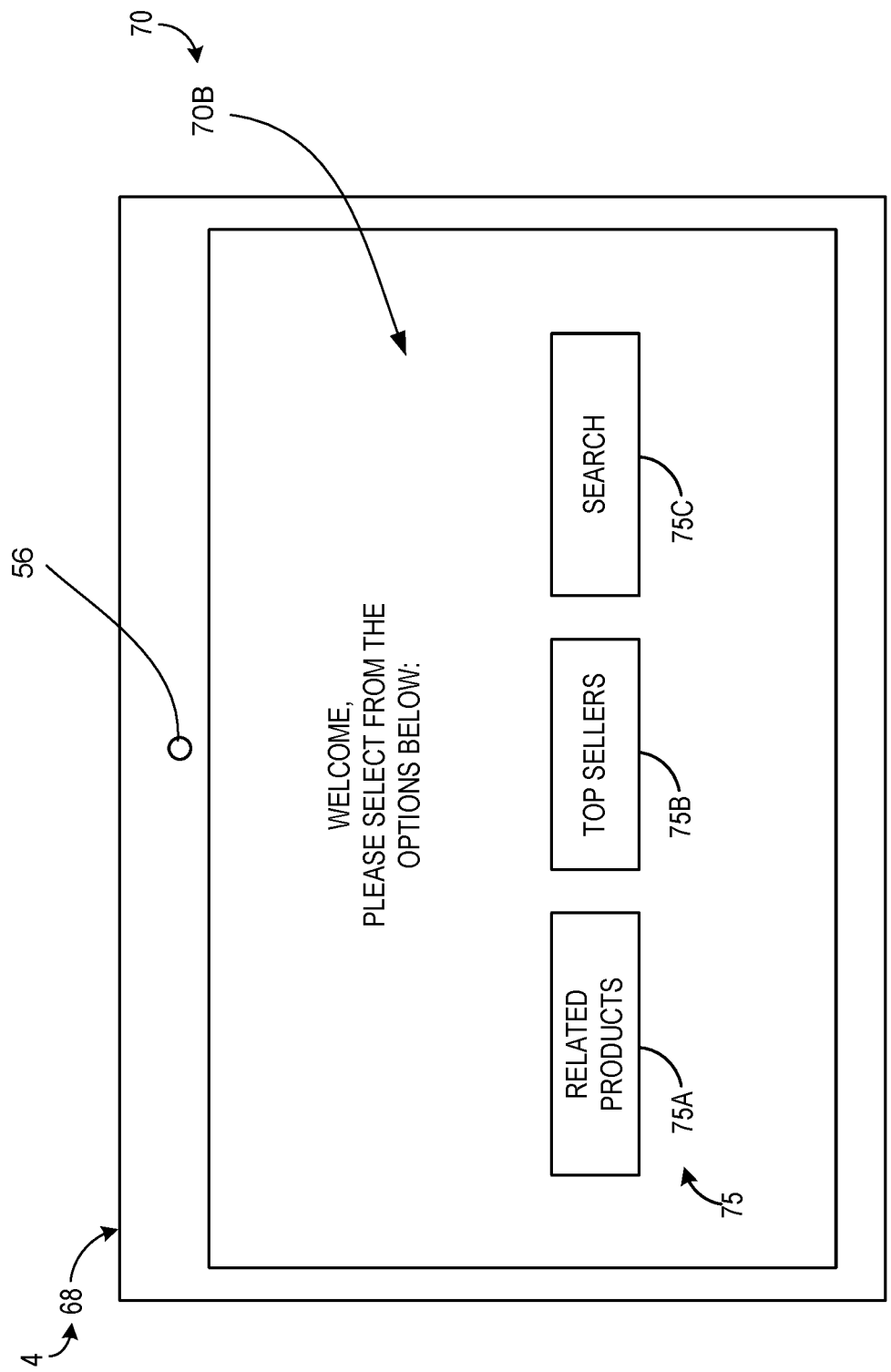
FIG. 13 shows a schematic depiction of an initial greeting interface, with selectors for navigating to the related products interface, search interface and top sellers interfaces of FIGS. 10-12.

Turning now to FIG. 13, the interactive transaction system 10A may encounter a shopper whose behavior or physical attributes, as captured in the images of the shopper, do not yield a match with a greeting interface as determined by the processor 42 executing the machine learning module 64. This may occur, for example, because the trained neural network 25 cannot classify the set of captured images of the shopper as being associated one of the plurality of greeting interfaces 70 with a confidence level that is above a predetermined minimum confidence threshold. In this case, the interactive transaction system may be configured to display the initial greeting interface 70B shown in FIG. 13. Thus, for sake of example, the shopper of FIG. 9, for whom a matching greeting interface is successfully determined, may be referred to as a first shopper, and another shopper, referred to as a second shopper, may approach the interactive transaction system and the captured images of the second shopper may not be sufficient to match to any of the plurality of greeting interface 70. In this example, it will be appreciated that the plurality of images is a first plurality of images and the shopper 12 is a first shopper. The processor 42 is further configured to receive a second plurality of images of a second shopper over a predetermined period of time and determine that the second plurality of images of the second shopper using the trained neural network cannot be classified as any of the plurality of greeting interfaces with a predetermined threshold level of confidence. The processor 42 is configured to modify the graphical user interface 68 on the touch screen device 58 to display input options to select one of the plurality of greeting interfaces, such as input selectors 75 including related products selector 75A, top sellers selector 75B, and search selector 75C as shown in FIG. 13. Thus, when confronted with a new shopper whose images are not able to be classified by the trained neural network 25 that has been trained based on the training data image set 84, the interactive transaction system 10A does not present a specific matching greeting interface 70A to this shopper. Instead, the interactive transaction system 10A presents an initial greeting interface 70B with options for this shopper to select one of the plurality of greeting interfaces 70.

As discussed above, the initial greeting interface 70B may also be used during a training phase, to create the tagged images that form the training data image set 84. To further train the neural network, the images of the second shopper and the second shopper's selection of a greeting interface 70 may be recorded and added to the training data set 84, to further train the trained neural network 25. With each additional training, the trained neural network 25 may become more robust, and more accurately predict the matching greeting interface 70 based on images of a wider variety of shopper images.

Figure 14:
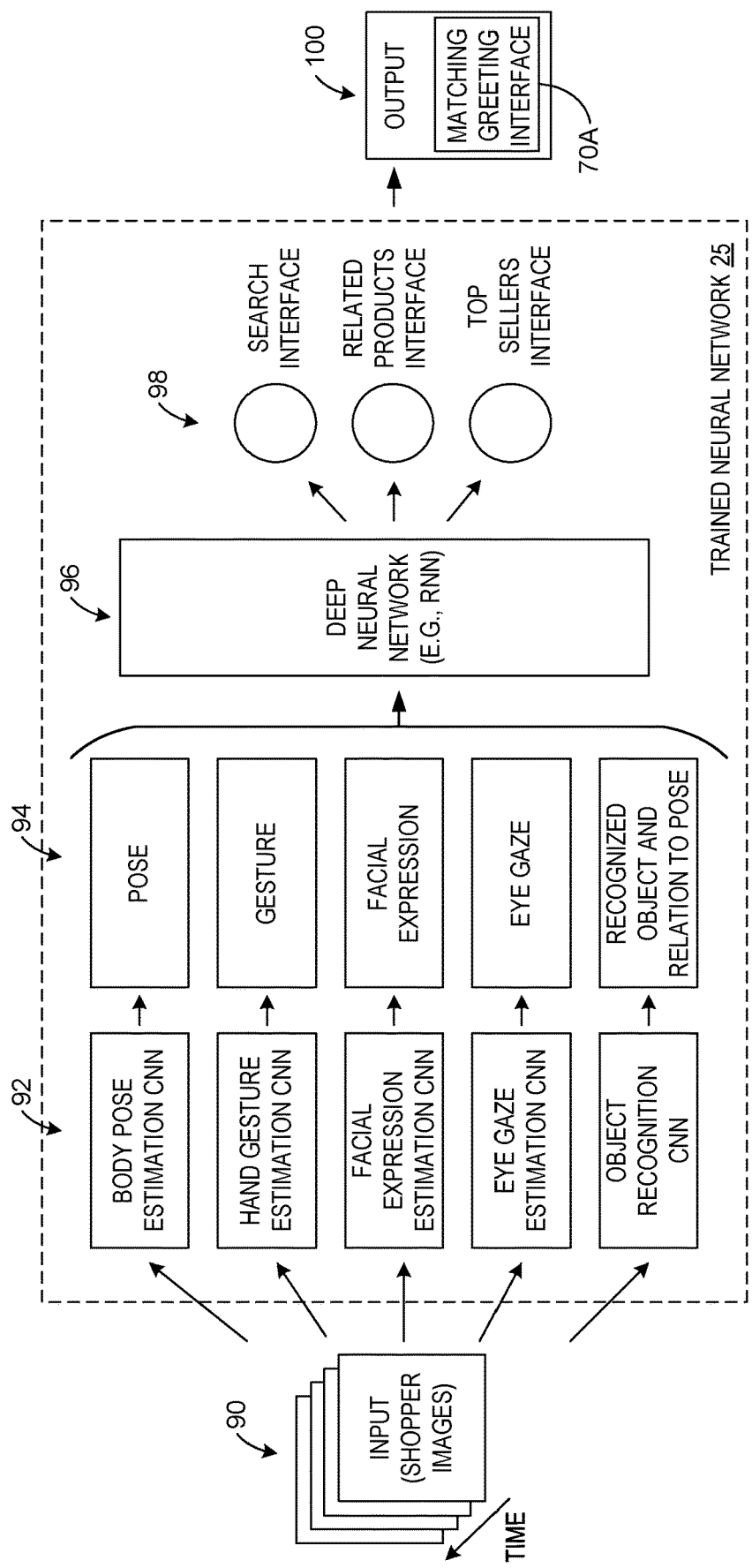
FIG. 14 shows a trained neural network of the interactive transaction system of FIG. 8.

Turning now to FIG. 14, the configuration and run-time application of the trained neural network 25 will be further explained. The trained neural network 25 may include one or more constituent neural networks 92 that are applied in parallel to the captured shopper images 90, which are captured by the optical sensor 56, to generate estimated feature vectors 94 that represent the features identified therein. For example, a body pose estimation convolutional neural network (CNN), hand gesture estimation CNN, facial expression estimation CNN, eye gaze estimation CNN and object recognition CNN may be provided, each of which computes a feature vector, and each of which is recurrent so that weights and associations between images at each of a plurality of timesteps may be computed. The computed feature vectors 94 may include a detected body pose, gesture, facial expression, eye gaze, recognized object and relation of recognized object to the detected pose. These computed feature vectors 94 are concatenated and fed to a deep neural network 96, which for example may be a recurrent convolutional neural network with one or more fully connected hidden layers. The deep neural network 96 is configured with a plurality of output nodes 98, such as the depicted search interface, related products interface, and top sellers interface nodes. Upon ingesting a set of captured images 90 as input, the trained neural network is configured to classify the input and produce as output 100 the class indicated by one of the output nodes along with a confidence rating in the classification, provided the confidence rating is above a threshold minimum confidence.

Regarding particular CNNs that might be selected, for the body pose estimation CNN, a CNN such as OpenPose, DeepCut, or AlphaPose may be utilized, for example. For the hand gesture estimation CNN, a 3D CNN could be used such as ResC3D. For the facial expression CNN, for example, a 2D CNN such as ResNet may be used, or a 3D CNN such as C3D may be used, and either may be trained on a dataset of the six basic facial expressions (anger, fear, surprise, sadness, joy, and disgust) plus a neutral facial expression, such as EmotioNet or Multi-PIE. Other datasets with other facial expressions may also be used. For the eye gaze CNN, for example, DeepVOG or GazeML may be used. For the object recognition CNN, a CNN such as ResNet may be trained on a corpus of images including the products for sale in the store and shopping carts, for example. A grasp detection CNN such as EnsembleNet or SelectNet may be additionally or alternatively used with the object recognition CNN to determine whether an object is grasped by a hand of a recognized body having a pose that was computed by the body pose estimation CNN.

Figure 15:
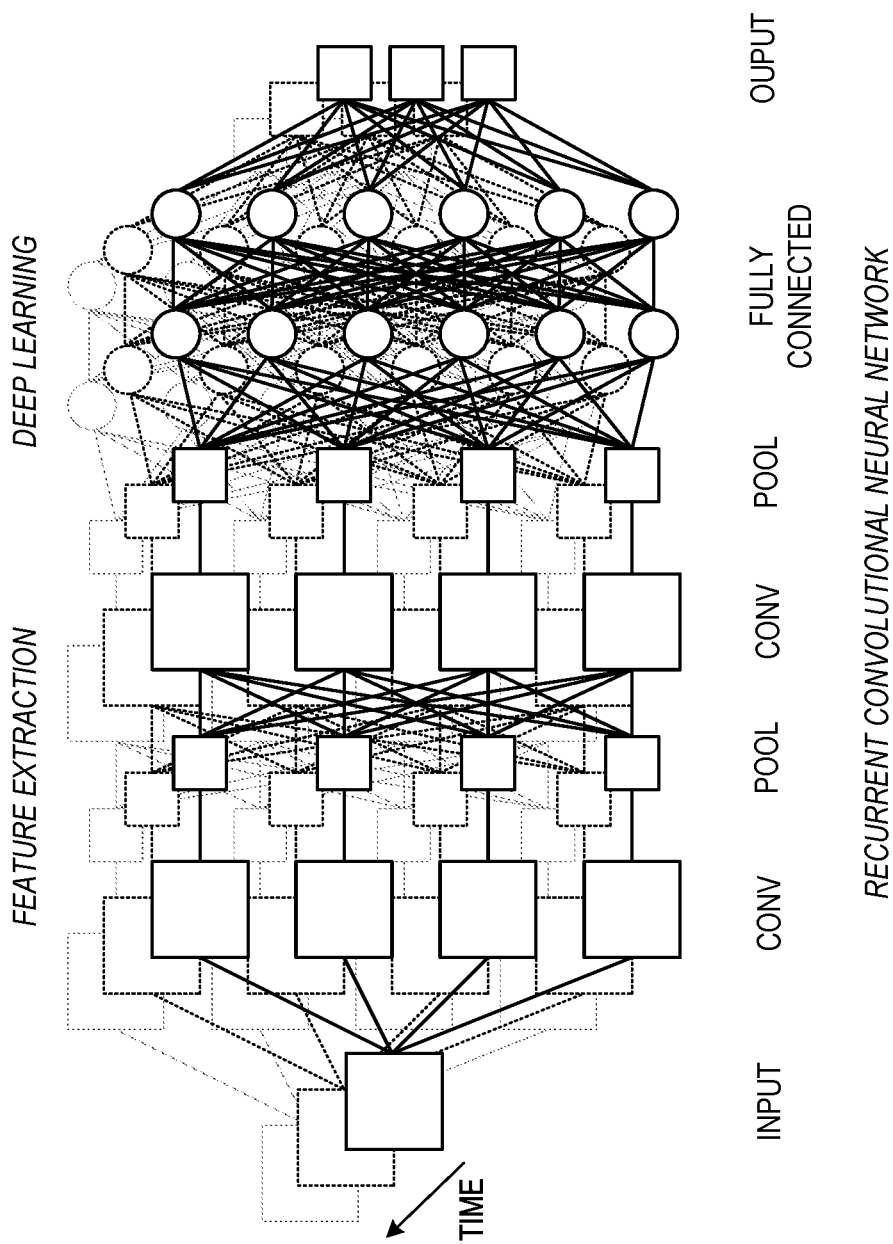
FIG. 15 shows an example recurrent convolutional neural network that may be used in the interactive transaction system of FIG. 8.

FIG. 15 illustrates an example recurrent convolutional neural network, which may be used as any of the constituent neural networks 92 of FIG. 14. The recurrent convolutional neural network depicted includes two sets convolution layers and pooling layers that perform feature extraction from images received as input, followed by two fully connected layers that perform deep learning, and an output layer. It will be appreciated that the fully layers are recurrent, and nodes in the fully connected layers are three dimensionally connected to nodes in temporally adjacent fully connected layers of the neural network. This enables the activation function of each node in the fully connected layers in a current timestep to be affected by weighted associations with nodes in prior time steps. It will be appreciated that more or fewer convolutional and pooling layers may be provided, as desired, and that the number of fully connected hidden layers may be increased or decreased as desired. Further, long short-term memory functionality (e.g., forget gates) may be provided at each node, to vary the extent to which connected nodes of prior timesteps affect the activation function of each node in the current timestep.

Returning to FIG. 14, the computed feature vectors 94 representing each of these identified features are concatenated and fed to the deep neural network 96, as described above. While each of the constituent neural networks 92 used for feature extraction have prior to run-time been separately trained on different corpuses of data particular to each type of feature being extracted, the deep neural network 96 has been trained during a training phase via the training processes described above to classify a set of captured images 90 of shoppers, which are pre-processed by the constituent neural networks 92, as being associated with one of a plurality of greeting interfaces 70, represented by output nodes 98. Thus, in the depicted example, based on the feature vector of extracted features 94 obtained at run-time, the deep neural network 96 is configured to output a classification selected from among the output nodes 98, which in the depicted example are search interface, related products interface, and top sellers interface. Each classification is associated with a probability of accuracy. If the input feature vector cannot be associated with any one output nodes 98 with above a minimum threshold probability, then the results may be deemed indeterminate, and the initial greeting interface 70B may be presented.

Figure 16:
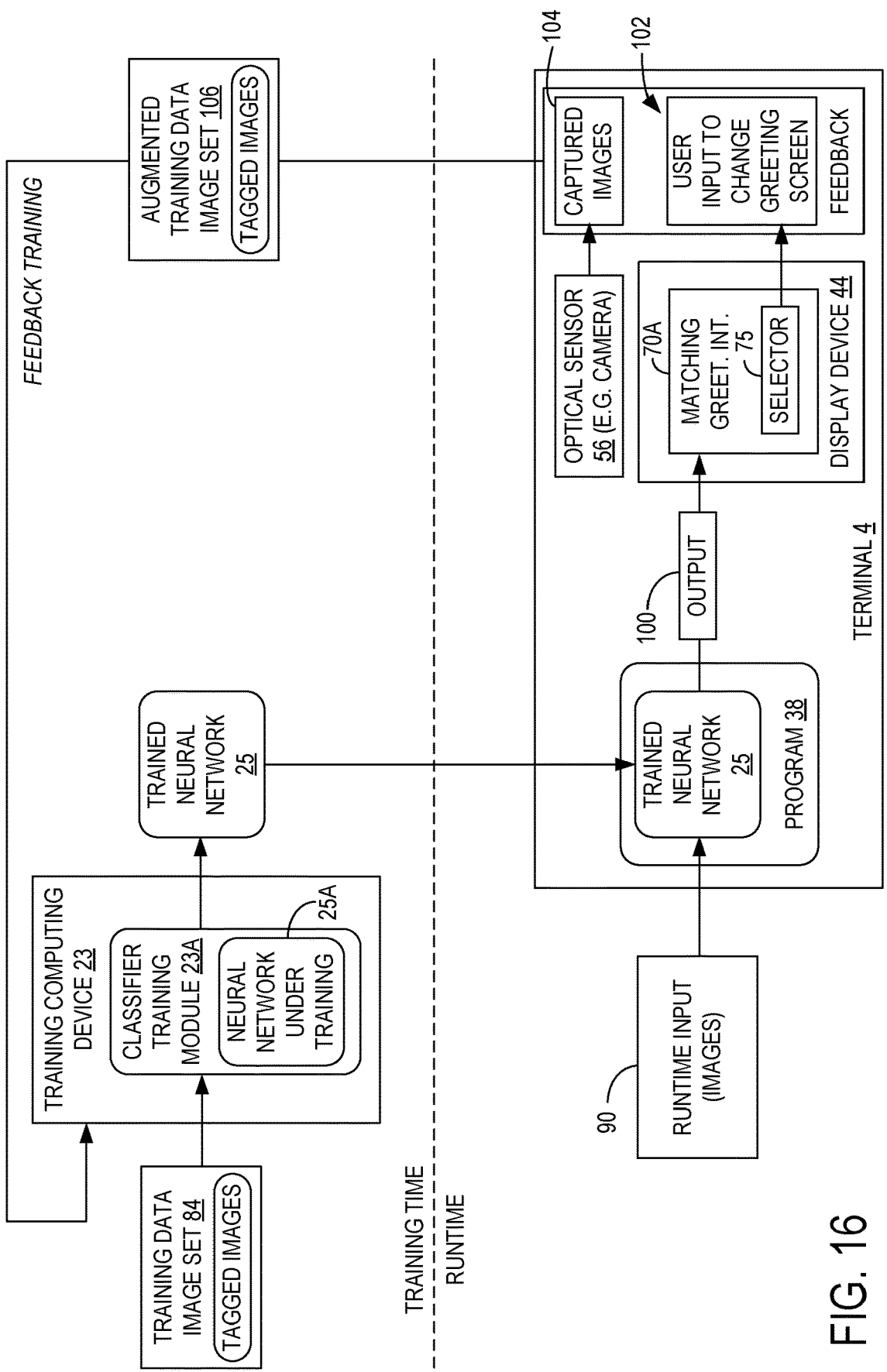
FIG. 16 shows a schematic view of training time and runtime of the interactive transaction system of FIG. 8, including a feedback training loop.

FIG. 16 illustrates training time and runtime of the interactive transaction system 10A. Initial training of the neural network under training 25A based on the training data image set 84 is depicted at top left of the figure, which produces an instance of the trained neural network 25. The bottom half of the figure illustrates runtime, at which runtime images are passed to the trained neural network 25, which has been installed as a component of program 38 on terminal 4. After a classification has been made at runtime and a matching greeting interface 70A is presented to a shopper as indicated, the processor 42 may be configured to determine whether the matching greeting interface 70A was correctly identified based on subsequent user inputs 102 and update, using feedback training, the trained neural network 25 based on the subsequent user inputs 98. Thus, the interactive transaction system 10A may record the selection by the shopper 12 of a greeting screen change input selector 75 along with concurrently captured images 104 of the shopper in an augmented training data image set 106 of tagged images (i.e., the captured images tagged with the changed greeting screen selection) to further train the neural network. "Concurrently" refers to images captured during or immediately before the shopper input. By further training the neural network in this manner, errors may be reduced over time.

Figure 17:
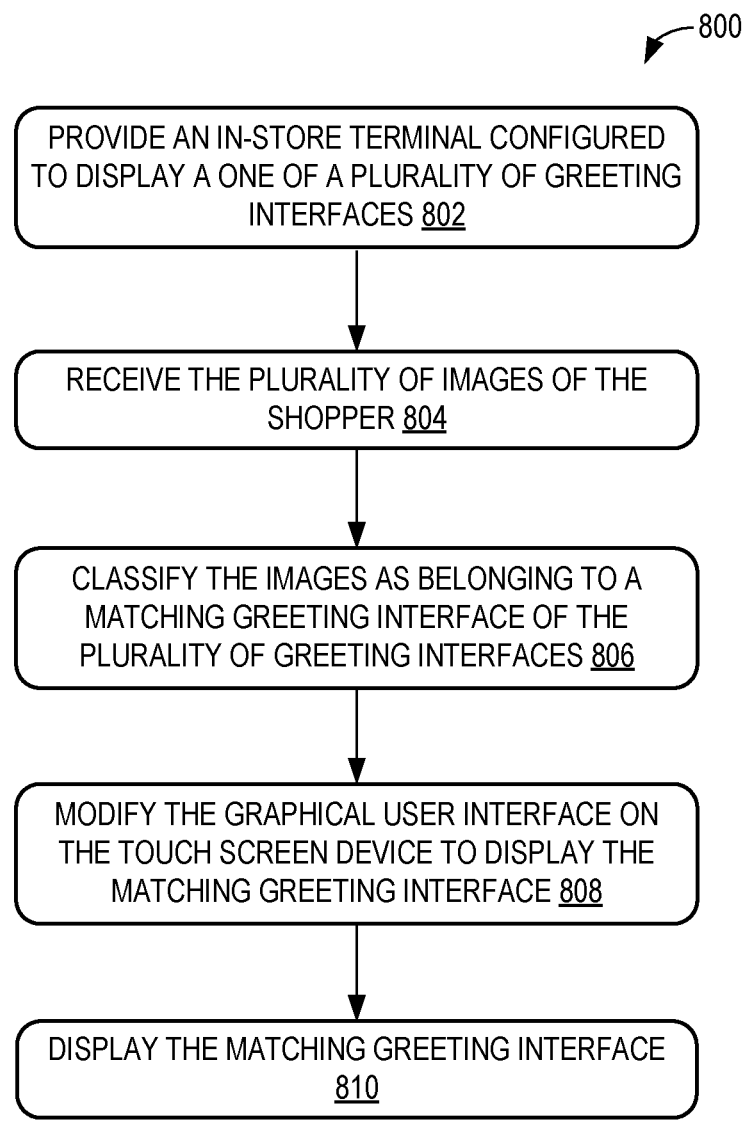
FIG. 17 shows a flowchart of a method of another embodiment of the present invention.

FIG. 17 illustrates another example embodiment of a method 800 of the present disclosure, which may be implemented using the hardware and software of interactive transaction system 10A described above, or other suitable hardware and software. At 802, the interactive transaction method includes providing a terminal located inside a physical merchant store adjacent or in proximity to a merchandise display. The terminal may include a processor and a touch screen device configured to display a graphical user interface where the graphical user interface is configured with a plurality of greeting interfaces. The terminal further may include an optical sensor for capturing a plurality of images of a shopper as the shopper approaches the terminal. At 802, the method may further include receiving, at a processor from the optical sensor, the plurality of images of the shopper over a predetermined period of time. At 804, the method may include classifying, via the processor, the images as belonging to a matching greeting interface of the plurality of greeting interfaces. At 806, the method may include modifying, via the processor, the graphical user interface on the touch screen device to display the matching greeting interface. The classifying step may be performed by the processor at the terminal. Alternatively, the captured images may be transmitted via a network to a remote computing device, such as a server, to classify the images.

After classifying the images as belonging to a matching greeting interface, the remote computing device may present the classification results to the processor, which then modifies the graphical user interface on the touch screen device to display the matching greeting interface, as shown at 810.

The methods described herein may alternatively be practiced with a computing device that includes a processor and non-volatile memory. The non-volatile memory stores instructions which, upon execution by the processor, cause the processor to receive, via an optical sensor, a plurality of images of a shopper over a predetermined period of time, classify the images as belonging to a matching greeting interface of a plurality of greeting interfaces using a trained neural network, the trained neural network having been trained on a training data image set of shopper images that have been tagged with one of the plurality of greeting interfaces selected by the shopper in each image, and modify a graphical user interface to display the matching greeting interface on a display associated with the processor. The computing device may be mobile and may be used at any suitable location inside or outside the merchant store. For example, the computing device may be positioned in front of the store. One or more cameras may be positioned overhead or around the store to capture images of the shopper from multiple angles and directions and transmit the images to the computing device for processing.

According to the systems and methods described above for applying the long tail strategy to physical merchant stores, the device can present as many varieties of products as possible while taking up minimal retail floor space, which is ideal for smaller retail stores, such as convenience stores, that are looking for ways to efficiently utilize retail space. Furthermore, a shopper no longer has to use a personal mobile device to retrieve a store website to browse merchandise or purchase items online—the claimed configuration adds convenience, context, and relevance to the process of accessing online merchandise in a physical merchant store. It is also part of the solution to the problem of excess inventory, allowing a store to strategically control the flow of inventory, delivering the right items, at the right time, in the right amounts. This enables store owners to stock fewer items, saving on real estate costs, while still servicing customer needs in a timely manner. The above described systems and methods also offer the advantage of enabling the shopper to more efficiently find items the shopper desires to purchase, thereby accelerating the shopping of the shopper, which benefits both the shopper and the store.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. An interactive transaction system comprising:
a terminal located inside a physical merchant store adjacent or in proximity to a merchandise display, the terminal including:
a touch screen device configured to display a graphical user interface, the graphical user interface being configured with a plurality of greeting interfaces, wherein a matching greeting interface of the plurality of greeting interfaces is configured to be displayed prior to a user interaction session;
an optical sensor for capturing a plurality of images of a shopper as the shopper approaches the terminal; and
a processor configured to, prior to a beginning of the user interaction session for the shopper:
receive the plurality of images of the shopper over a predetermined period of time,
using a trained neural network, classify the images as belonging to the matching greeting interface of the plurality of greeting interfaces, the trained neural network having been trained on a training data image set of shopper images that have been tagged with one of the plurality of greeting interfaces selected by an imaged shopper in each shopper image of the training data image set, and
modify the graphical user interface on the touch screen device to display the matching greeting interface prior to the beginning of the user interaction session for the shopper.

2. The interactive transaction system of claim 1, wherein the plurality of greeting interfaces includes an interface for searching for a product via a keyword search tool and an interface that displays a plurality of selectable product icons that are related to physical products positioned on the adjacent merchandise display.

3. The interactive transaction system of claim 2,
wherein the matching greeting interface is the interface that displays a plurality of selectable product icons that are related to physical products positioned on the adjacent merchandise display; and
wherein the matching greeting interface includes an input selector to select one or more products, and a purchase selector including at least one buy option to purchase the one or more products, the buy option having an associated delivery method for receiving the one or more products.

4. The interactive transaction system of claim 2, wherein the matching greeting interface is the interface for searching for a product via a keyword search tool and includes a search field for receiving a search term.

5. The interactive transaction system of claim 2, wherein the plurality of selectable product icons that are related to physical products positioned on the adjacent merchandise display are determined by an algorithm that calculates a correlation score based on a database received from a server, the database including product category, purchase history, price range, and brand and outputs selectable product icons that satisfy a predetermined correlation score.

6. The interactive transaction system of claim 1, wherein the modifying the graphical user interface includes changing a currently displayed greeting interface to the matching greeting interface.

7. The interactive transaction system of claim 1, wherein the graphical user interface further comprises one or more greeting screen change input selectors, each greeting screen change input selector being configured to modify the graphical user interface to display a different matching greeting interface of the plurality of matching greeting interfaces upon selection by the shopper.

8. The interactive transaction system of claim 7, wherein the processor is further configured to:
record the selection by the shopper of the greeting screen change input selector along with concurrently captured images of the shopper in an augmented training data image set; and
further train the neural network based at least in part on the augmented training data set.

9. The interactive transaction system of claim 1, wherein the plurality of images is a first plurality of images and the shopper is a first shopper, and wherein the processor is further configured to:
receive a second plurality of images of a second shopper over a predetermined period of time;
determine that the second plurality of images of the second shopper using the trained neural network cannot be classified as any of the plurality of greeting interfaces with a predetermined threshold level of confidence; and
modify the graphical user interface on the touch screen device to display input options to select one of the plurality of greeting interfaces.

10. An interactive transaction method comprising:
providing a terminal located inside a physical merchant store adjacent or in proximity to a merchandise display, the terminal including a processor, a touch screen device configured to display a graphical user interface, the graphical user interface being configured with a plurality of greeting interfaces, the terminal further including an optical sensor for capturing a plurality of images of a shopper as the shopper approaches the terminal; and
prior to a beginning of a user interaction session for the shopper:
receiving, at a processor from the optical sensor, the plurality of images of the shopper over a predetermined period of time;
using a trained neural network, classifying, via the processor, the images as belonging to a matching greeting interface of the plurality of greeting interfaces, the trained neural network having been trained on a training data image set of shopper images that have been tagged with one of the plurality of greeting interfaces selected by an imaged shopper in each shopper image of the training data image set; and
modifying, via the processor, the graphical user interface on the touch screen device to display the matching greeting interface prior to the beginning of the user interaction session for the shopper.

11. The interactive transaction method of claim 10, wherein the plurality of greeting interfaces includes an interface for searching for a product via a keyword search tool and an interface that displays a plurality of selectable product icons that are related to physical products positioned on the adjacent merchandise display.

12. The interactive transaction method of claim 11, wherein the matching greeting interface is the interface that displays a plurality of selectable product icons that are related to physical products positioned on the adjacent merchandise display; and
wherein the matching greeting interface includes an input selector to select one or more products, a purchase selector including at least one buy option to purchase the one or more products, the buy option having an associated delivery method for receiving the one or more products.

13. The interactive transaction method of claim 11, wherein the matching greeting interface is the interface for searching for a product via a keyword search tool, the interface for searching for a product via a keyword search tool includes a search field for receiving a search term.

14. The interactive transaction method of claim 10, wherein the modifying the graphical user interface includes changing a currently displayed greeting interface to the matching greeting interface.

15. The interactive transaction method of claim 10, wherein the graphical user interface further comprises one or more greeting screen change input selectors, each greeting screen change input selector being configured to modify the graphical user interface to display a different matching greeting interface of the plurality of matching greeting interfaces upon selection by the shopper.

16. The interactive transaction method of claim 15, further comprising:
recording the selection by the shopper of the greeting screen change input selector along with concurrently captured images of the shopper in an augmented training data image set; and
further training the neural network based at least in part on the augmented training data set.

17. The interactive transaction method of claim 10, wherein the plurality of images is a first plurality of images and the shopper is a first shopper, the method further comprising:
receiving, at the processor from the optical sensor, a second plurality of images of a second shopper over a predetermined period of time;
determining that the second plurality of images of the second shopper using the trained neural network cannot be classified as any of the plurality of greeting interfaces with a predetermined threshold level of confidence; and
modifying the graphical user interface on the touch screen device to display input options to select one of the plurality of greeting interfaces.

18. A computing device comprising:
a processor and non-volatile memory, the non-volatile memory storing instructions which, upon execution by the processor, cause the processor to, prior to a beginning of a user interaction session for a shopper:
receive, via an optical sensor, a plurality of images of the shopper over a predetermined period of time,
classify the images as belonging to a matching greeting interface of a plurality of greeting interfaces using a trained neural network, the trained neural network having been trained on a training data image set of shopper images that have been tagged with one of the plurality of greeting interfaces selected by an imaged shopper in each shopper image of the training data image set, and
modify a graphical user interface to display the matching greeting interface on a display associated with the processor prior to the beginning of the user interaction session for the shopper.

19. The interactive transaction system of claim 1, wherein:
each greeting interface of the plurality of greeting interfaces includes a corresponding set of graphical user interface (GUI) elements; and
the sets of GUI elements differ among the plurality of greeting interfaces.

20. The interactive transaction method of claim 10, wherein:
each greeting interface of the plurality of greeting interfaces includes a corresponding set of graphical user interface (GUI) elements; and
the sets of GUI elements differ among the plurality of greeting interfaces.

* * * * *